(12) United States Patent
Chu et al.

(10) Patent No.: US 11,303,835 B2
(45) Date of Patent: Apr. 12, 2022

(54) PIXEL ARRAY AND IMAGE SENSOR INCLUDING THE SAME

(71) Applicant: Samsung Electronics Co., Ltd., Suwon-si (KR)

(72) Inventors: Myunglae Chu, Hwaseong-si (KR); Sungyong Kim, Hwaseong-si (KR); Seoksan Kim, Suwon-si (KR); Minwoong Seo, Hwaseong-si (KR); Jaekyu Lee, Seongnam-si (KR); Jongyeon Lee, Seoul (KR); Junan Lee, Seongnam-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 49 days.

(21) Appl. No.: 16/996,264

(22) Filed: Aug. 18, 2020

(65) Prior Publication Data
US 2021/0152772 A1    May 20, 2021

(30) Foreign Application Priority Data
Nov. 15, 2019 (KR) .......... 10-2019-0146958

(51) Int. Cl.
*H04N 5/3745* (2011.01)
*H04N 5/378* (2011.01)

(52) U.S. Cl.
CPC ......... *H04N 5/37452* (2013.01); *H04N 5/378* (2013.01)

(58) Field of Classification Search
CPC .... H04N 5/37452; H04N 5/378; H04N 5/374; H04N 5/37455; H01L 27/14603; H01L 27/14609; H01L 27/14643
See application file for complete search history.

(56) References Cited

U.S. PATENT DOCUMENTS

| 6,580,454 | B1 | 6/2003 | Perner et al. |
| 9,247,162 | B2 | 1/2016 | Shen et al. |
| 10,003,761 | B2 | 6/2018 | Totsuka et al. |
| 2001/0040632 | A1 | 11/2001 | Yang et al. |
| 2008/0149843 | A1* | 6/2008 | Tredwell ............. H04N 5/3741 250/370.11 |

(Continued)

FOREIGN PATENT DOCUMENTS

| JP | 2956065 B2 | 10/1999 |
| JP | 3576073 B2 | 10/2004 |

(Continued)

*Primary Examiner* — Lin Ye
*Assistant Examiner* — John H Morehead, III
(74) *Attorney, Agent, or Firm* — Harness, Dickey & Pierce, P.L.C.

(57) ABSTRACT

Provided are a pixel array and an image sensor. The pixel array includes a plurality of pixels, which are arranged in a matrix form and which convert an optical signal into an electrical signal. The pixel array includes a first pixel arranged in a first row of the pixel array and a second pixel arranged in a second row of the pixel array, wherein each of the first pixel and the second pixel includes a first memory storing a digital reset value according to internal noise, the first memory of the first pixel stores m-bit data (where m is a natural number equal to or greater than 2), and the first memory of the second pixel stores n-bit data (where n is a natural number less than m).

20 Claims, 30 Drawing Sheets

(56) References Cited

U.S. PATENT DOCUMENTS

| | | | | |
|---|---|---|---|---|
| 2009/0295951 | A1* | 12/2009 | Fowler | H04N 5/23238 |
| | | | | 348/262 |
| 2010/0208115 | A1* | 8/2010 | Sugawa | H04N 5/37452 |
| | | | | 348/308 |
| 2012/0147231 | A1* | 6/2012 | Inoue | H04N 5/232123 |
| | | | | 348/294 |
| 2013/0100173 | A1* | 4/2013 | Chaji | G09G 5/10 |
| | | | | 345/690 |
| 2016/0088251 | A1* | 3/2016 | Luo | H04N 5/37452 |
| | | | | 250/208.1 |
| 2016/0255296 | A1 | 9/2016 | Iwabuchi et al. | |
| 2017/0180703 | A1* | 6/2017 | Kovacovsky | G01S 17/46 |
| 2018/0054583 | A1 | 2/2018 | Iwabuchi et al. | |
| 2018/0220092 | A1* | 8/2018 | Takaya | H04N 5/359 |
| 2018/0275255 | A1* | 9/2018 | Yates | H04N 5/3745 |
| 2019/0182449 | A1* | 6/2019 | Baek | H04N 5/3765 |
| 2019/0379848 | A1* | 12/2019 | Berkovich | H04N 5/36963 |

FOREIGN PATENT DOCUMENTS

| | | |
|---|---|---|
| JP | 4389190 B2 | 12/2009 |
| KR | 10-0227691 | 11/1999 |
| KR | 10-2011-0078886 A | 7/2011 |

\* cited by examiner

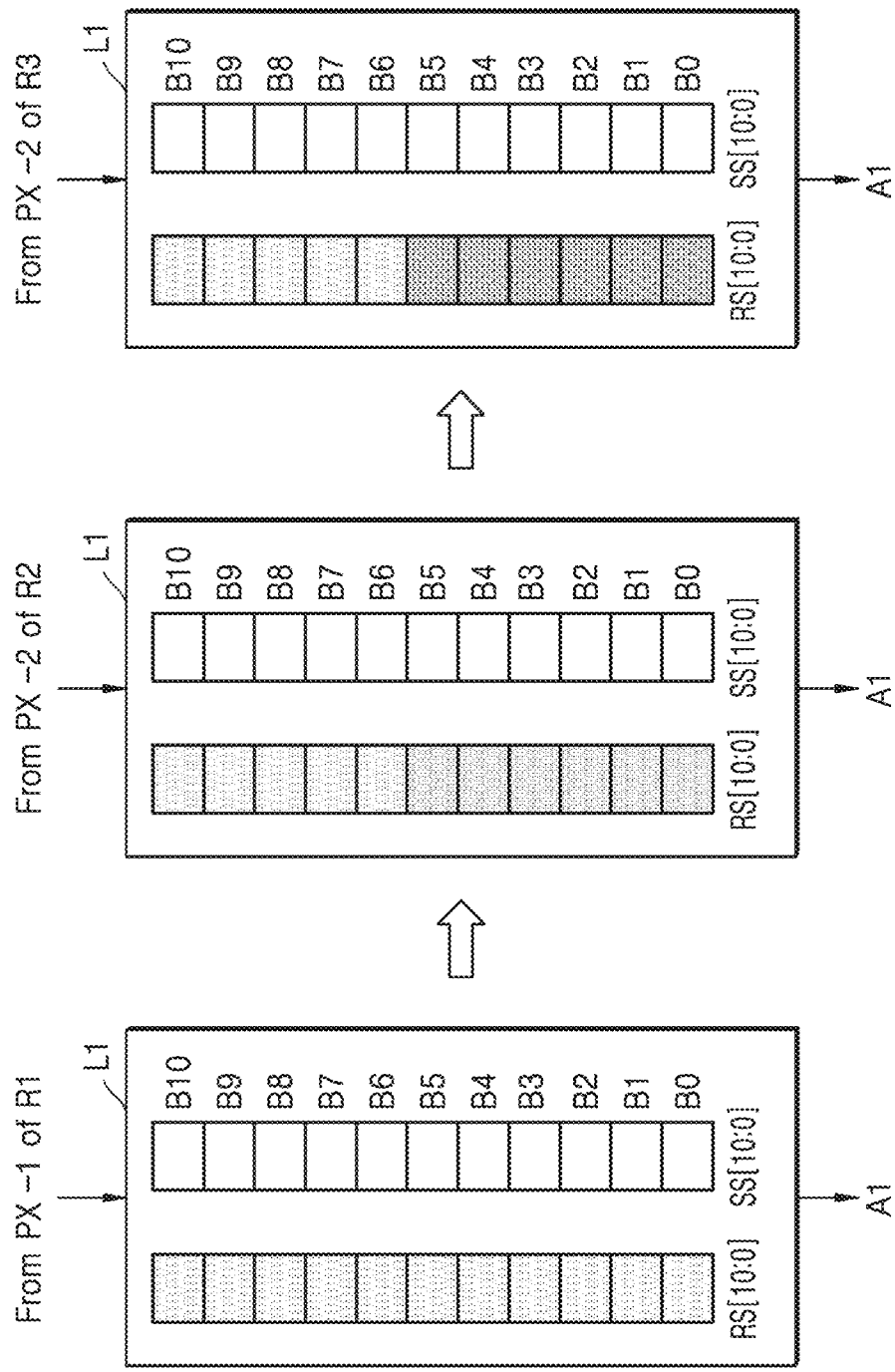

PIXEL ARRAY AND IMAGE SENSOR INCLUDING THE SAME

CROSS-REFERENCE TO RELATED APPLICATION

This application claims the benefit of Korean Patent Application No. 10-2019-0146958, filed on Nov. 15, 2019, in the Korean Intellectual Property Office, the disclosure of which is incorporated herein in its entirety by reference.

BACKGROUND

Inventive concepts relate to a pixel array and/or an image sensor including the pixel array, and more particularly, to a pixel array including a memory, and/or an image sensor including the pixel array.

Image sensors are devices for capturing 2-dimensional and/or 3-dimensional images of objects. Image sensors generate images of objects by using photosensitive devices responding according to the intensity of light reflected by the objects. Recently, along with the development of complementary metal-oxide semiconductor (CMOS) technology, CMOS image sensors using CMOS have been widely used.

SUMMARY

Inventive concepts provides a pixel array having a reduced area and an increased frame rate, and/or an image sensor including the pixel array.

According to some example embodiments of inventive concepts, there is provided a a pixel array including plurality of pixels, arranged in a matrix form, each of the plurality of pixels configured to convert an optical signal into an electrical signal. The pixel array includes a first pixel in a first row of the pixel array, and a second pixel in a second row of the pixel array. Each of the first pixel and the second pixel includes a first memory configured to store a reset value associated with internal noise, the first memory of the first pixel is configured to store m-bit data (where m is a natural number greater than or equal to 2), and the first memory of the second pixel is configured to store n-bit data (where n is a natural number less than m).

According to some example embodiments, there is provided an image sensor including a pixel array comprising a plurality of pixels, each of the plurality of pixels comprising a memory configured to store a reset value and a sensing value, wherein a number of bits of the memory of a first pixel among the plurality of pixels is greater than a number of bits of the memory of a second pixel among the plurality of pixels, and a read circuit configured to receive, from the pixel array, a plurality of reset values and a plurality of sensing values sequentially on a row basis, and configured to generate image data based on the plurality of reset values and the plurality of sensing values.

According to some example embodiments, there is provided an image sensor including a ramp signal generator configured to generate a ramp signal, a counter block configured to generate a counting code, a pixel array comprising a plurality of pixels arranged in a matrix form, each of the plurality of pixels configured to generate a reset value and a sensing value based on the ramp signal and the counting code and configured to store the reset value and the sensing value; and a read circuit configured to receive a plurality of reset values and a plurality of sensing values from the pixel array and configured to generate a plurality of pixel values based on the plurality of reset values and the plurality of sensing values. The pixel array includes, a first pixel in a first row, and a second pixel in a second row. Each of the first pixel and the second pixel comprises a first memory configured to store a reset value according to internal noise, the first memory of the first pixel is configured to store m-bit data (where m is a natural number equal to or greater than 2), and the first memory of the second pixel is configured to store n-bit data (where n is a natural number less than m).

BRIEF DESCRIPTION OF THE DRAWINGS

Example embodiments of inventive concepts will be more clearly understood from the following detailed description taken in conjunction with the accompanying drawings in which:

FIG. 7 is a diagram illustrating an example of an operation method of a latch, according to some example embodiments of inventive concepts;

DETAILED DESCRIPTION OF EXAMPLE EMBODIMENTS

Hereinafter, embodiments of inventive concepts will be described in detail with reference to the accompanying drawings.

Figure 1:
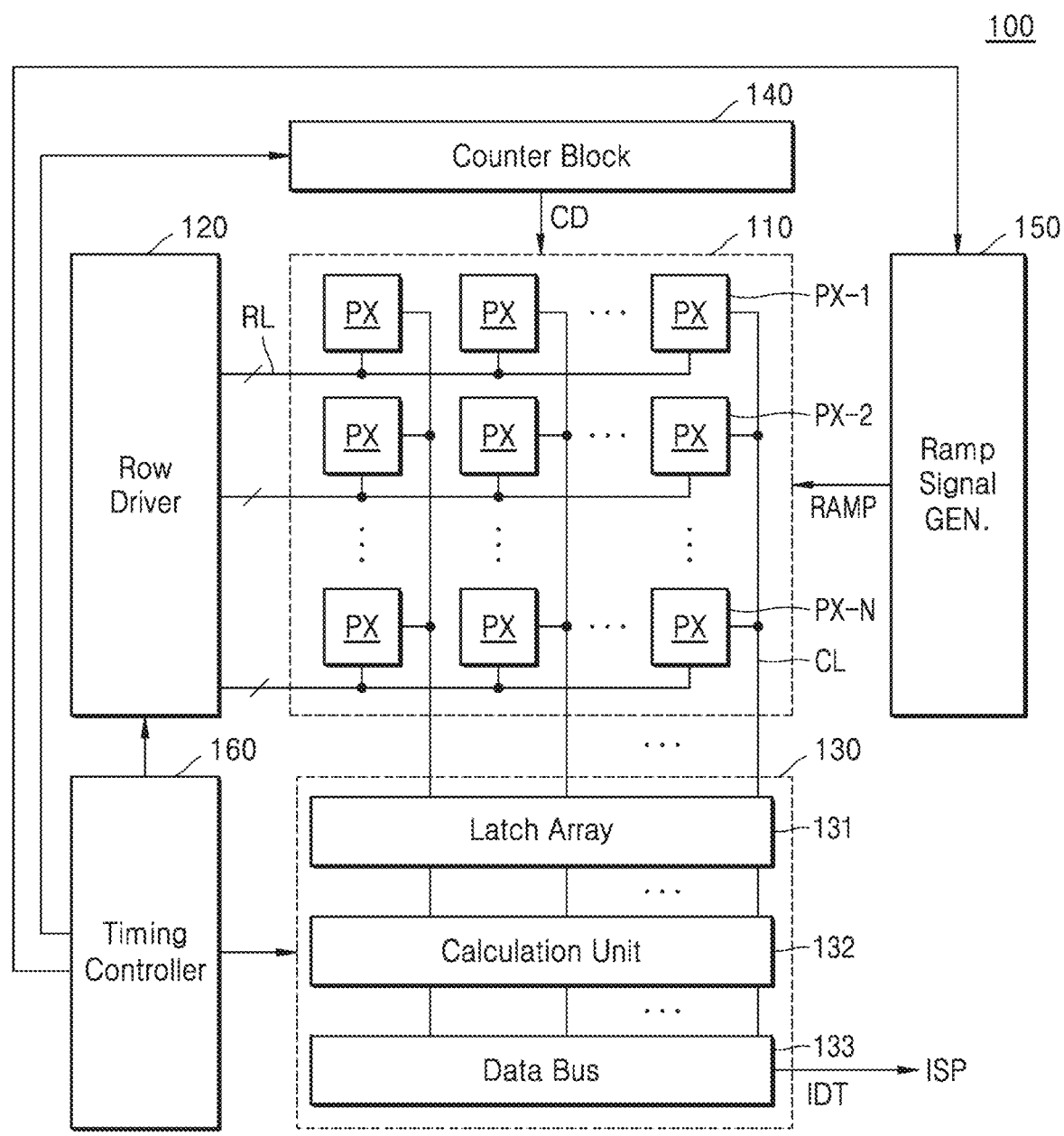
FIG. 1 is a block diagram illustrating an image sensor according to some example embodiments of inventive concepts.
Figure 2:
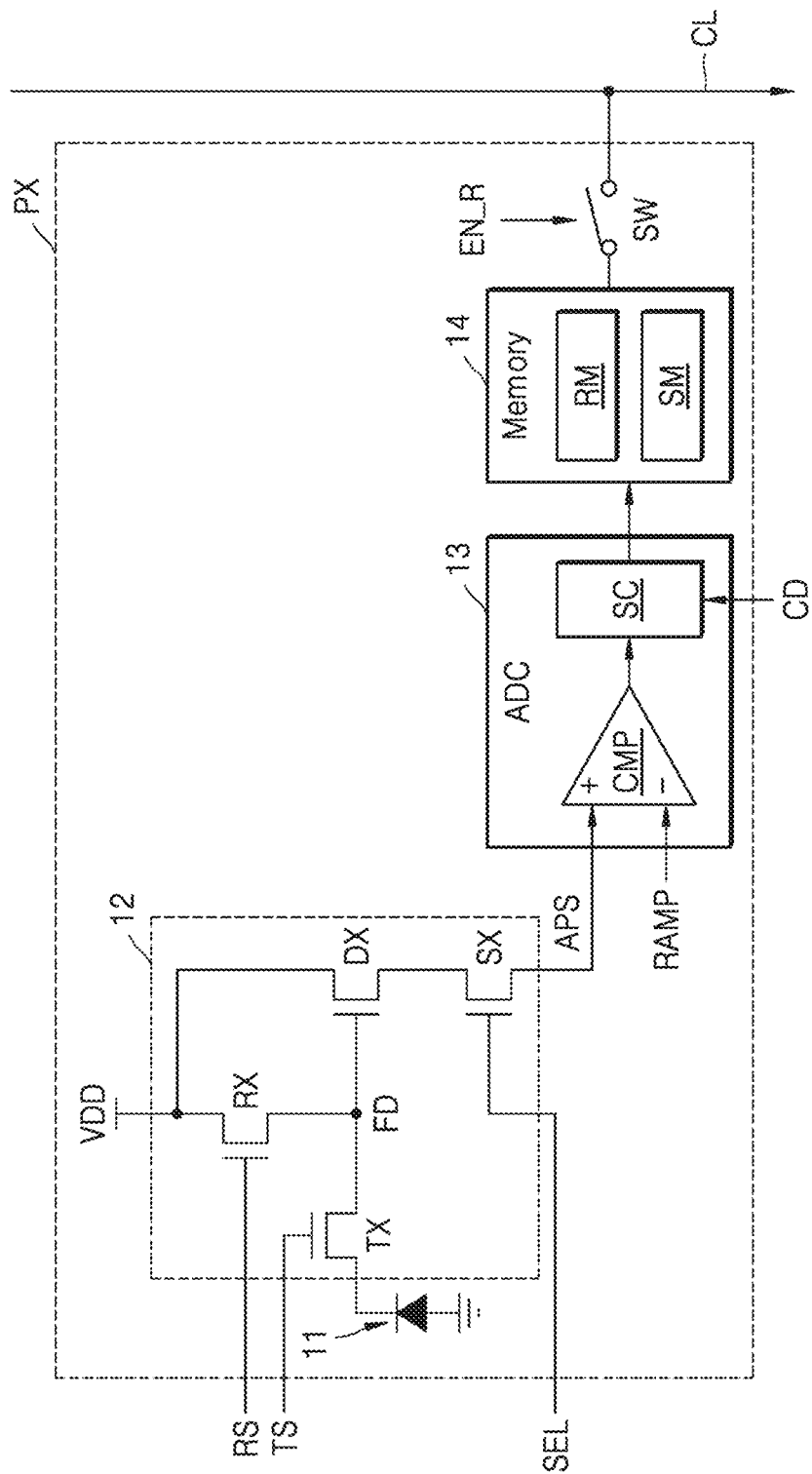
FIG. 2 illustrates an implementation example of a pixel according to some example embodiments of inventive concepts.

FIG. 1 is a block diagram illustrating an image sensor according to some example embodiments of inventive concepts, and FIG. 2 illustrates an implementation example of a pixel according to some example embodiments of inventive concepts.

An image sensor 100 may be mounted in an electronic device having a function of sensing an image and/or of light. For example, the image sensor 100 may be mounted in an electronic device, such as a camera, a smart phone, a wearable device, an Internet-of Things (IoT) device, a household appliance, a tablet personal computer (PC), a personal digital assistant (PDA), a portable multimedia player (PMP), a navigation system, a drone, an advanced drivers assistance system (ADAS), or the like. Alternatively or additionally, the image sensor 100 may be mounted in an electronic device included as a part in vehicles, furniture, manufacturing facilities, doors, and/or various measuring instruments.

Referring to FIG. 1, the image sensor 100 may include a pixel array 110, a row driver 120, a read circuit 130, a counter block 140, a ramp signal generator 150, and a timing controller 160, and the read circuit 130 may include a latch circuit 131, a calculation circuit 132, and a data bus 133. The image sensor 100 may be formed in one semiconductor chip or in a plurality of stacked semiconductor chips.

The pixel array 110 includes a plurality of row lines RL, a plurality of column lines CL, and a plurality of pixels PX connected to the plurality of row lines RL and the plurality of column lines CL. The pixel array 110 may be arranged in a matrix form, e.g. in a rectangular matrix form.

Each of the plurality of row lines RL may extend in a row direction and may be connected to pixels PX arranged in the same row. For example, each row line RL may transfer a control signal, which is output from the row driver 120, to respective transistors of a pixel circuit (12 of FIG. 2), as described below with reference to FIG. 2.

Each of the plurality of pixels PX may include at least one photosensitive device (alternatively referred to as a photoelectric conversion device), for example, a photodiode 11 as in FIG. 2. Each of the plurality of pixels PX may sense light by using the at least one photosensitive device, and may convert the sensed light into a pixel signal (for example, a pixel voltage). The pixel signal may be an electrical signal. Because a photosensitive device of a pixel PX emits a large number of electrons (photocharges) when bright light is applied thereto, a pixel voltage output from the pixel PX may decrease with the increasing amount of light received by the pixel PX. For example, the photosensitive device may include at least one of a photodiode, an organic photoconductive film, a perovskite photodiode, a phototransistor, a photogate, or a pinned photodiode.

Figure 16A:
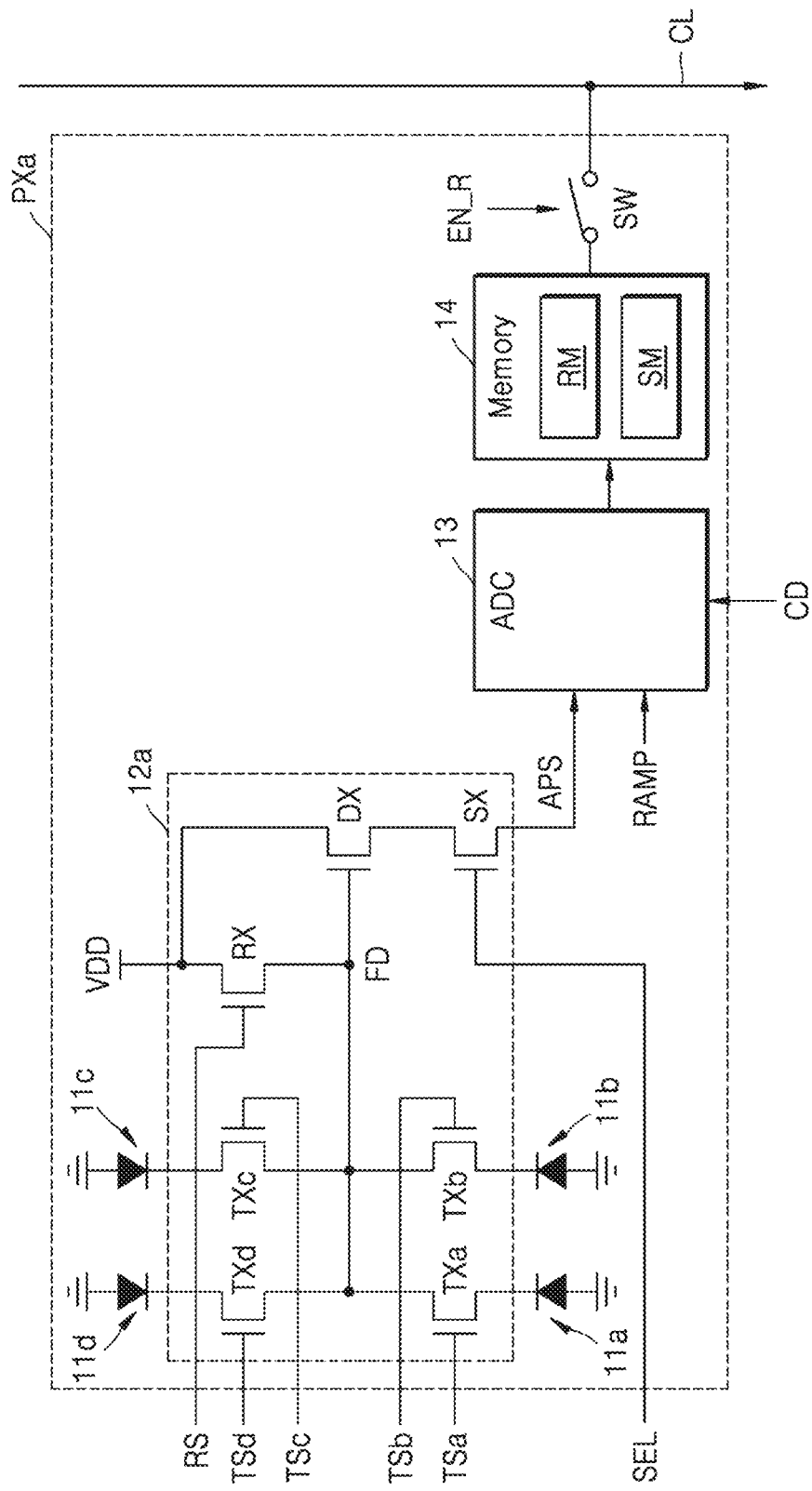
FIGS. 16A and 16B each illustrate an implementation example of a pixel, according to some example embodiments of inventive concepts.
Figure 16B:
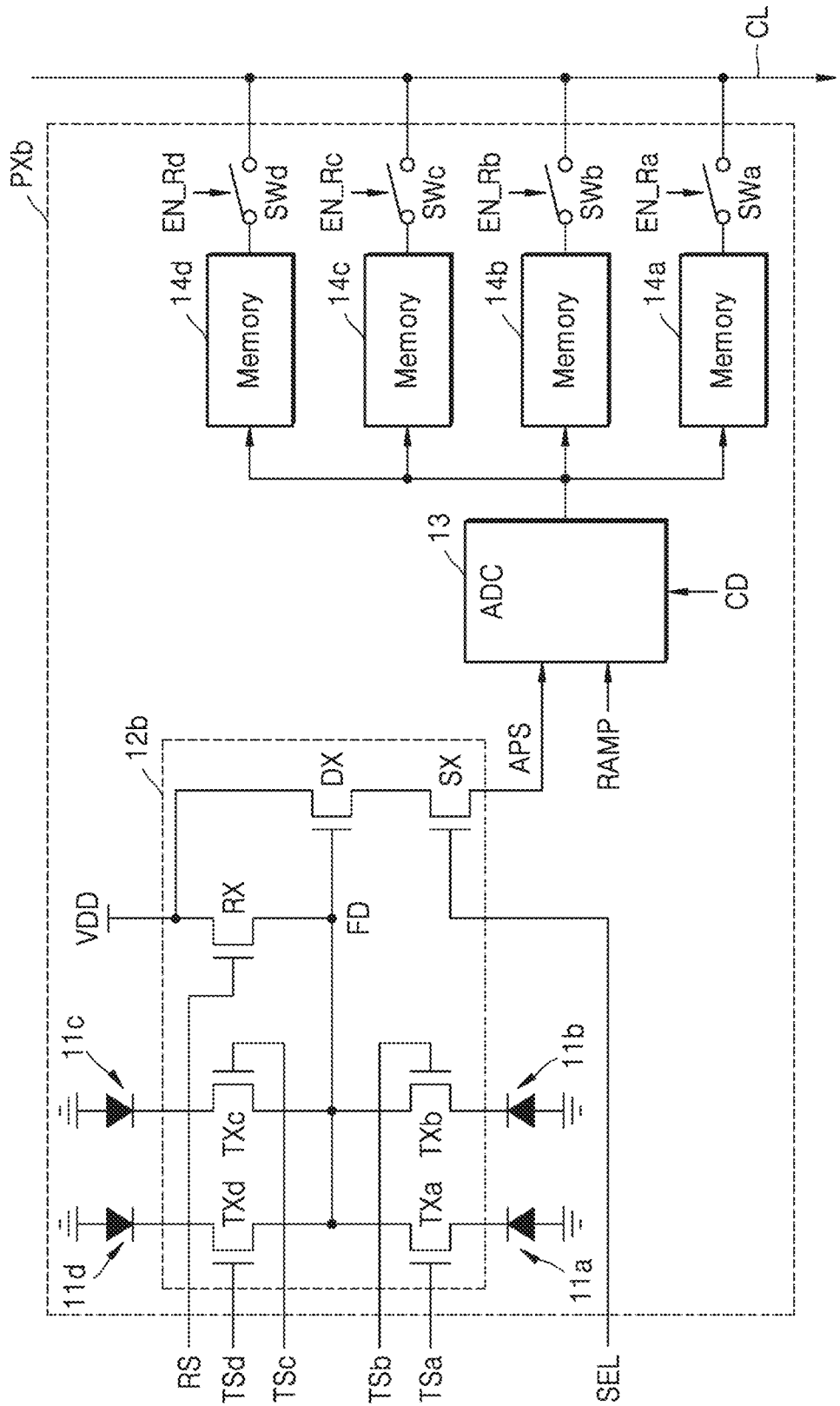

In some example embodiments, as shown in FIGS. 16A and 16B, each of the plurality of pixels PX may include a plurality of photosensitive devices. The plurality of photosensitive devices may be arranged in the same layer or may be stacked in a vertical direction.

A microlens for concentrating light may be arranged over each of the plurality of pixels PX or over each pixel group including adjacent pixels PX. Each of the plurality of pixels PX may sense light in a particular spectral range from light received through the microlens. For example, the pixel array 110 may include a red pixel for converting light in a red spectral range into an electrical signal, a green pixel for converting light in a green spectral range into an electrical signal, and a blue pixel for converting light in a blue spectral range into an electrical signal. A color filter for transmitting light in a particular spectral range may be arranged over each of the plurality of pixels PX. The pixels PX may be arranged in a Bayer filter pattern. However, inventive concepts is not limited thereto, and the pixel array 110 may include pixels for converting, into electrical signals, light in other spectral ranges other than red, green, and blue spectral ranges.

In some example embodiments, each of the plurality of pixels PX may have a multilayer structure. The pixel PX having a multilayer structure may include stacked photosensitive devices for converting light in different spectral ranges into electrical signals, and the electrical signals corresponding to different colors may be generated by the photosensitive devices. In other words, electrical signals corresponding to a plurality of colors may be output from one pixel PX.

Referring to FIG. 2, the pixel PX may include the photodiode 11, the pixel circuit 12, an analog-digital converter (ADC) 13, and a memory 14, and the pixel PX may further include a switch SW. The photodiode 11 and the pixel circuit 12 may be collectively referred to as a pixel core.

The photodiode 11 may be substituted with another photosensitive device. The pixel circuit 12 may include a reset transistor RX, a transfer transistor TX, a drive transistor DX, and a select transistor SX. However, a structure of the pixel circuit 12 is not limited thereto, and the structure of the pixel circuit 12 may vary.

The photodiode 11 may generate photocharges, and a number of photocharges generated may vary according to the intensity of light incident thereon. The pixel circuit 12 may generate an analog pixel signal APS corresponding to the photodiode 11 or internal reset noise.

The pixel circuit 12 may operate based on control signals (for example, SEL, RS, and/or TS) output from the row driver (120 of FIG. 1). The transfer transistor TX may transfer photocharges from the photodiode 11 to a floating diffusion node FD according to a transfer control signal TS. The drive transistor DX may amplify the photocharges according to a potential due to the photocharges accumulated at the floating diffusion node FD, and thus output the photocharges through the select transistor SX. When the select transistor SX is turned on in response to a select control signal SEL, a sensing signal, for example, a photo-sensing signal corresponding to a voltage level of the floating diffusion node FD may be output as the analog pixel signal APS, for example, a pixel voltage.

The reset transistor RX may reset the floating diffusion node FD based on a power supply voltage VDD, according to a reset control signal RS. Here, a reset signal, for example, a noise signal that corresponds to the voltage level of the floating diffusion node FD may be output as the analog pixel signal APS.

The ADC 13 may convert the analog pixel signal APS into a digital value. The ADC 13 may respectively convert the reset signal and the sensing signal, which are received as analog pixel signals APS, into a reset value and a sensing value, which are digital signals.

Pixel values generated from the plurality of pixels PX may have deviations caused by characteristics unique to the respective pixels PX and/or deviations caused by differences between characteristics of logic (e.g. combinatorial logic) for outputting pixel signals from the pixels PX. To compensate for such deviations between the pixel values, calculating a reset component, for example, the reset signal, and an image component, for example, the sensing signal, either or both of which may be output as the analog pixel signals APS from each of the plurality of pixels PX, and extracting a difference therebetween as a valid signal component may be performed, and this process is referred to as correlated double sampling. The reset value and the sensing value, which are generated by the ADC 13, may be transferred to the read circuit 130, and the read circuit 130 may calculate, as a pixel value, a difference between the reset value and the sensing value, thereby applying correlated double sampling.

The ADC 13 may include a comparator CMP and a sampling circuit SC, and the comparator CMP may compare a ramp signal RAMP received from the ramp signal generator (150 of FIG. 1) with the analog pixel signal APS. The sampling circuit SC may sample a counting code CD received from the counter block (140 of FIG. 1), based on a comparison result received from the comparator CMP. In this way, the reset value and the sensing value may be generated.

The memory 14 may store and/or hold the reset value and the sensing value. The memory 14 may include a reset memory RM (alternatively referred to as a first memory) and a sensing memory SM (alternatively referred to as a second memory), and the reset value and the sensing value may be respectively stored in the reset memory RM and the sensing memory SM. In some example embodiments, the memory 14 may be implemented by volatile memory such as dynamic random access memory (DRAM) and/or static random access memory (SRAM). However, inventive concepts are not limited thereto, and the memory 14 may be implemented by one or more of various storage devices, such as non-volatile memory, a latch, a register, and/or the like. In some example embodiments, the memory 14 may be implemented on a same semiconductor chip as, or alternatively on a different semiconductor chip than, that of the pixel circuit 12.

Figure 3A:
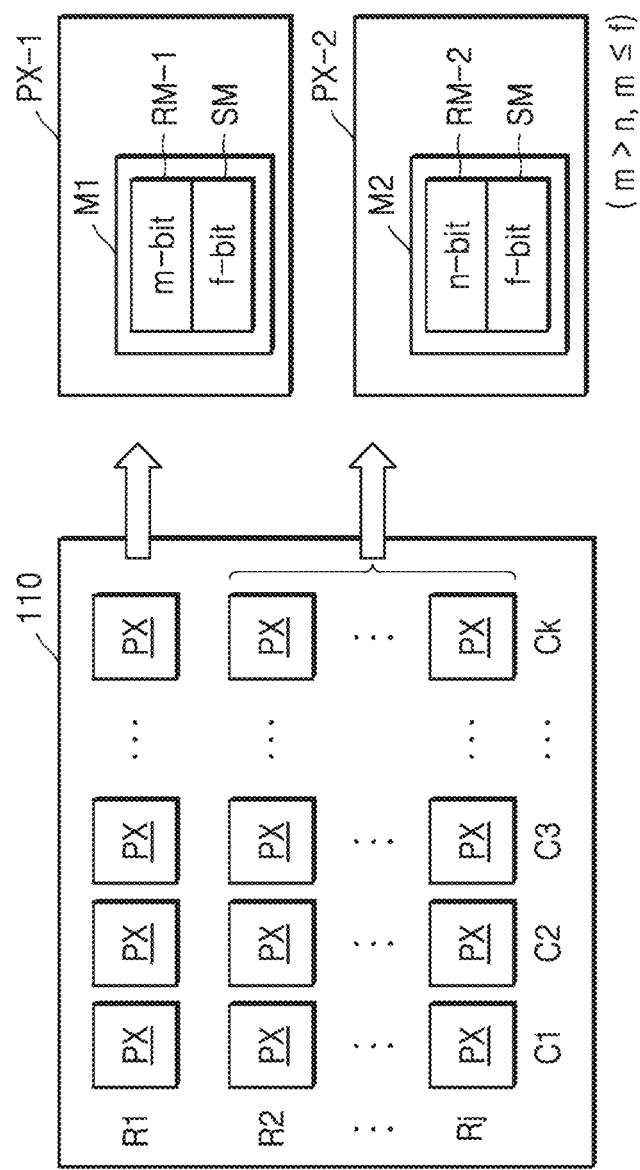
FIG. 3A is a diagram illustrating a memory included in a plurality of pixels of a pixel array, according to some example embodiments of inventive concepts.
Figure 3B:
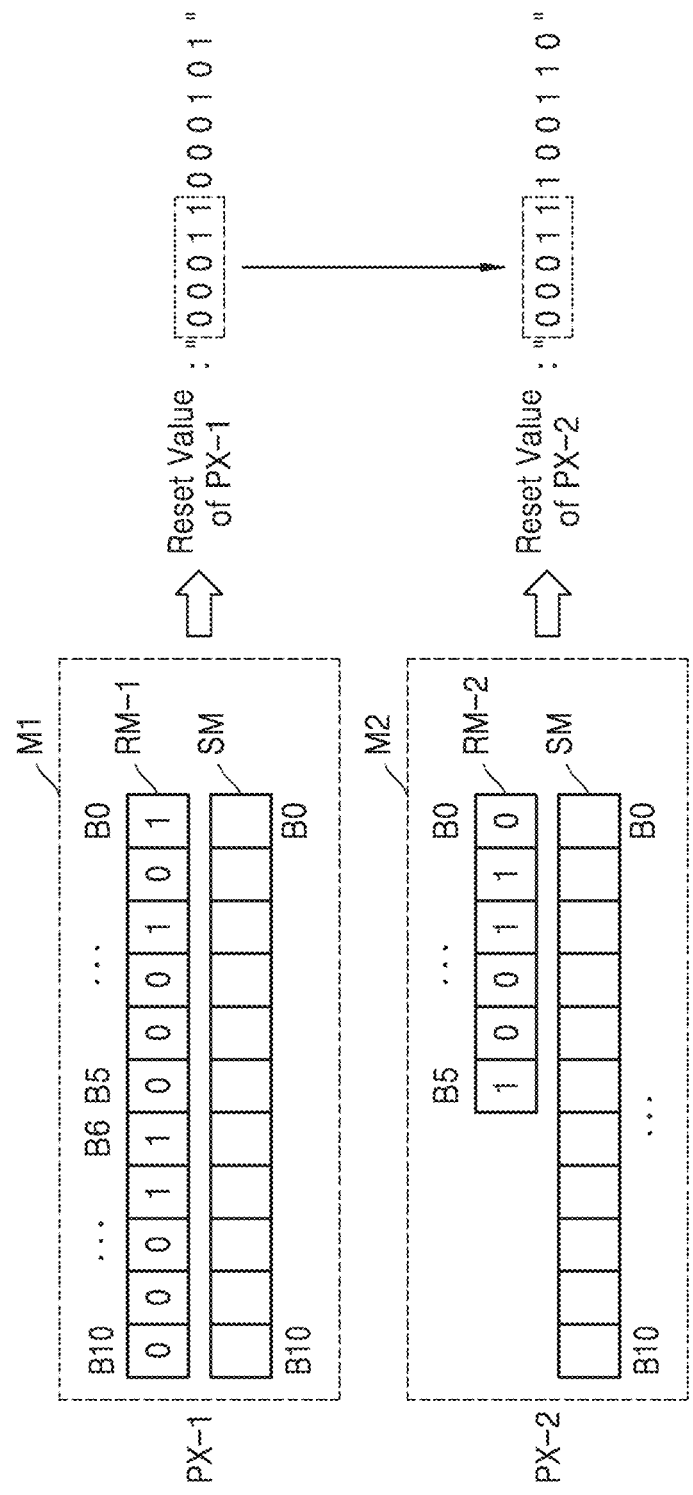
FIGS. 3B and 3C are diagrams illustrating examples of memories of a first pixel and a second pixel in a pixel array, according to some example embodiments of inventive concepts.

When the switch SW is turned on based on a row enable signal EN_R provided from the row driver 120, the reset value and the sensing value stored in the memory 14 may be transferred to the read circuit 130 through a column line CL. As shown in FIGS. 3A and 3B, the number of bits of the reset memory RM of at least one of the plurality of pixels PX of the pixel array 110 (e.g., the number of memory cells included in the reset memory RM) may be different from the number of bits of the reset memory RM of the other pixels PX. For description convenience, the pixel PX having a relatively high number of bits of the reset memory RM will be referred to as a first pixel PX-1, and the pixel PX having a relatively low number of bits of the reset memory RM will be referred to as a second pixel PX-2. The number of bits of the sensing memory SM of the first pixel PX-1 may be equal to the number of bits of the sensing memory SM of the second pixel PX-2.

For example, all of the bits of the reset value may be stored in the reset memory RM of the first pixel PX-1, and some low-order bits (less significant bits) of the reset value may be stored in the reset memory RM of the second pixel PX-2. The reset value and the sensing value of the pixel PX may be transferred to the read circuit 130 and may be calculated by the read circuit 130. Because the reset value results from/is associated with a noise component, deviations between the reset values of the plurality of pixels PX are not greater/not necessarily greater than deviations between the sensing values thereof, and in a plurality of reset values corresponding to the plurality of pixels PX, some high-order bits (more significant bits) may be the same between the plurality of reset values. Therefore, while the reset memory RM of the first pixel PX-1 may store all bits of the reset value and the reset memory RM of the second pixel PX-2 may store some low-order bits of the reset value, at least one high-order bit, for example, the most significant bit (MSB), of the reset value of the first pixel PX-1 may be used as at least one high-order bit of the reset value of the second pixel PX-2, when the reset value and the sensing value of the second pixel PX-2 are calculated.

In some example embodiment, the number of bits of the reset memory RM of the first pixel PX-1 may be equal to the number of bits of the sensing memory SM thereof, and the number of bits of the reset memory RM of the second pixel PX-2 may be less than the number of bits of the sensing memory SM thereof. In some example embodiments, the number of bits of the reset memory RM of each of the first pixel PX-1 and the second pixel PX-2 may be less than the number of bits of the sensing memory SM thereof.

In some example embodiments, pixels PX of a first row of the pixel array 110 may include first pixels PX-1, and pixels PX of the other rows may include second pixels PX-2. However, inventive concepts are not limited thereto, and an arrangement of the first pixel PX-1 and the second pixel PX-2 in the pixel array 110 may vary. For example, although first pixels PX-1 are illustrated as an outermost row of the pixel array 110, example embodiments are not limited thereto, and first pixels PX-1 may correspond to rows that inner within the pixel array 110. The arrangement of the first pixel PX-1 and the second pixel PX-2 will be described in detail with reference to FIGS. 11A to 12C.

Continuing with reference to FIG. 1, each of the plurality of column lines CL may extend in a column direction, and may be connected to the pixels PX arranged in the same column. Each of the plurality of column lines CL may transfer reset values and sensing values of the pixels PX to the read circuit 130, on the basis of each row of the pixel array 110.

The row driver 120 may provide control signals to each of the plurality of pixels PX of the pixel array 110 through the plurality of row lines RL, thereby driving the pixel array 110. For example, the row driver 120 may provide the reset control signal RS and the transfer control signal TS to each of the plurality of pixels PX of the pixel array 110. Alternatively or additionally, the row driver 120 may provide a control signal for controlling the plurality of pixels PX of the pixel array 110 on a row basis, for example, the row enable signal EN_R.

The counter block 150 may generate the counting code CD and may provide the counting code CD to each of the plurality of pixels PX. The counting code CD may be or correspond to, for example, a gray code. For example, the counter block 150 may include a plurality of counters respectively corresponding to a plurality of columns of the pixel array 110, and each of the plurality of counters may generate the counting code CD and provide the counting code CD to pixels PX included in a column corresponding thereto. Each of the plurality of counters may generate the counting code CD by counting clock signals, in response to a counting enable signal.

The ramp signal generator 150 may generate the ramp signal RAMP and may provide the ramp signal RAMP to each of the plurality of pixels PX. For example, the ramp signal generator 150 may include a signal generator for generating the ramp signal RAMP and a plurality of buffers respectively corresponding to a plurality of rows of the pixel array 110. Each of the plurality of buffers may buffer the ramp signal RAMP generated by the signal generator, and may provide the ramp signal RAMP to pixels PX of a row corresponding thereto.

The pixel array 110 may generate and store the reset value and the sensing value for each pixel PX based on the control signals received from the row driver 120, the counting code CD received from the counter block 140, and/or the ramp signal RAMP received from the ramp signal generator 150, and may transfer the reset value and the sensing value to the read circuit 130 on a row-by-row basis.

The latch circuit 131 may store a plurality of reset values and/or a plurality of sensing values, which are received from the pixel array 110 on a row basis. The calculation circuit 132 may receive the plurality of reset values and/or the plurality of sensing values from the latch circuit 131 and may generate a plurality of pixel values on a row basis based on the plurality of reset values and the plurality of sensing values. For example, the calculation circuit 132 may include a plurality of adders. The calculation circuit 132 may include a plurality of calculators corresponding to the plurality of columns of the pixel array 110, and each of the plurality of calculators may generate a pixel value by calculating a corresponding reset value and a corresponding sensing value. For example, each of the plurality of operators may include an adder. The plurality of pixel values may be output as image data IDT through the data bus 133. For example, the image data IDT may be provided to an image signal processor ISP.

When the reset value and the pixel value are stored in the latch circuit 131, at least one high-order bit among a plurality of bits included in the reset value of the first pixel PX-1 may be stored as at least one high-order bit when the reset value of the second pixel PX-2 is stored. For example, assuming that an 11-bit reset value is stored in the reset memory RM of the first pixel PX-1 and that a 6-bit reset value is stored in the reset memory RM of the second pixel PX-2, the 11-bit reset value of the first pixel PX-1 may be transferred to the latch circuit 131 and used when the pixel value of the first pixel PX-1 is generated, and then, the 6-bit reset value of the second pixel PX-2 may be transferred to and stored in the latch circuit 131. The high-order 5 bits of the 11-bit reset value of the first pixel PX-1, which has been previously stored in the latch circuit 131, may be used as high-order 5 bits of the reset value of the second pixel PX-2.

As described above, the image sensor 100 according to some example embodiments of inventive concepts may use at least one high-order bit of the reset value of the first pixel PX-1 as at least one high-order bit of the reset value of the second pixel PX-2. Accordingly, the number of bits of the reset memory RM of the second pixel PX-2 may be reduced, and the areas of the pixel array 110 and the image sensor 100 may be reduced. Alternatively or additionally, when the reset value and the sensing value are transferred from the pixel array 110 to the read circuit 130, because transfer time of reset values and sensing values of rows including the second pixels PX-2 may be reduced, a frame rate of the image sensor 100 may be increased.

Figure 3C:
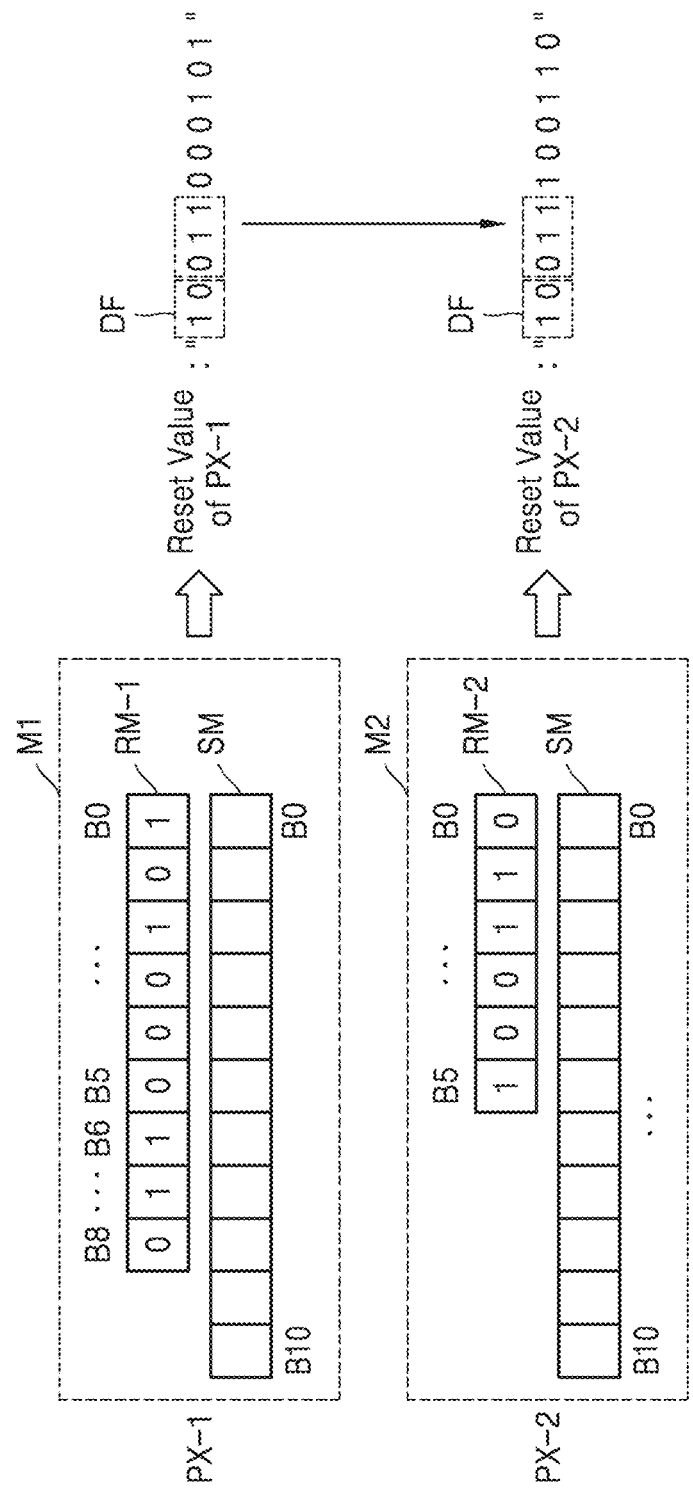

FIG. 3A is a diagram illustrating a memory included in a plurality of pixels of a pixel array, according to some example embodiments of inventive concepts, and FIGS. 3B and 3C are diagrams illustrating examples of memories of a first pixel and a second pixel in a pixel array, according to some example embodiments of inventive concepts.

Referring to FIG. 3A, the pixel array 110 may include the plurality of pixels PX constituting/corresponding to a plurality of rows R1 to Rj and a plurality of columns C1 to Ck. The pixels PX included in at least one row, for example, a first row R1, among the plurality of rows R1 to Rj may be implemented by the first pixel PX-1, and the pixels PX included in the other rows, for example, second to $j^{-th}$ rows R2 to Rj, may be implemented by the second pixel PX-2.

The first pixel PX-1 and the second pixel PX-2 may respectively include memories (a first memory M1 and a second memory M2) and, as described above with reference to FIG. 2, the first pixel PX-1 and the second pixel PX-2 may respectively include reset memories RM-1 and RM-2 storing reset values and respectively include sensing memories SM storing sensing values.

The first reset memory RM-1 of the first pixel PX-1 may include m-bit memory cells (where m is a natural number equal to or greater than 2), and the sensing memory SM of the first pixel PX-1 may include f-bit memory cells (where f is a natural number equal to or greater than m). The second reset memory RM-2 of the second pixel PX-2 may include n-bit memory cells (where n is a natural number less than m), and the sensing memory SM of the second pixel PX-2 may include f-bit memory cells. For example, the first reset memory RM-1 may store an m-bit reset value, and the second reset memory RM-2 may store an n-bit reset value. In some example embodiments, the number of memory cells of the first reset memory RM-1, that is, m, may be more than the number of memory cells of the sensing memory SM, that is, n. Herein, either or both of the number of memory cells of the first memory RM-1 and the number of memory cells of the second memory RM-2 may be predetermined, or, alternatively, may be variable, and may be based on/determined through experimentation.

For example, when the reset value output from the ADC (13 of FIG. 2) has m bits, the first reset memory RM-1 of the first pixel PX-1 may store all bits of the reset value, and the second reset memory RM-2 of the second pixel PX-2 may store low-order n bits of the reset value. As another example, when the reset value output from the ADC (13 of FIG. 2) has m+1 bits, the first reset memory RM-1 of the first pixel PX-1 may store low-order m bits of the reset value, and the second reset memory RM-2 of the second pixel PX-2 may store low-order n bits of the reset value. Descriptions will be made by taking an example with reference to FIG. 3B.

Referring to FIG. 3B, the first memory M1 of the first pixel PX-1 may include 22-bit memory cells, and the second memory M2 of the second pixel PX-2 may include 17-bit memory cells. In the first memory M1, 11-bit memory cells may constitute/correspond to the first reset memory RM-1, and the other 11-bit memory cells may constitute/correspond to the sensing memory SM. In the second memory M2, 6-bit memory cells may constitute/correspond to the second reset memory RM-2, and the other 11-bit memory cells may constitute/correspond to the sensing memory SM. High-order 5 bits of data stored in the first reset memory RM-1, that is, the seventh to eleventh bits B6 to B10, may be used as high-order 5 bits of data of the reset value of the second pixel PX-2.

For example, when data "00011000101" is stored in the first reset memory RM-1 of the first pixel PX-1 and data "100110" is stored in the second reset memory RM-2 of the second pixel PX-2, data "00011100110", into which the high-order 5 bits of data stored in the first reset memory RM-1, that is, "00011", and the data "100110" stored in the second reset memory RM-2 are combined, may be calculated as the reset value of the second pixel PX-2.

Referring to FIG. 3C, the first memory M1 of the first pixel PX-1 may include 20-bit memory cells, and the second memory M2 of the second pixel PX-2 may include 17-bit memory cells. In the first memory M1, 9-bit memory cells may constitute the first reset memory RM-1, and the other 11-bit memory cells may constitute/correspond to the sensing memory SM. In the second memory M2, 6-bit memory cells may constitute/correspond to the second reset memory RM-2, and the other 11-bit memory cells may constitute/correspond to the sensing memory SM. 2 bits of default data DF may be used as high-order 2 bits of data of each of the first pixel PX-1 and the second pixel PX-2. In addition, high-order 3 bits of data stored in the first reset memory RM-1, that is, the seventh to ninth bits B6 to B8, may be used as middle-order 3 bits of the reset value of the second pixel PX-2. Here, the default data DF may be set in advance in a manufacturing phase and/or a test phase of the image sensor 100, or, alternatively, may be variable based upon operation of the pixel array 110.

For example, when data "011000101" is stored in the first reset memory RM-1 of the first pixel PX-1 and data "100110" is stored in the second reset memory RM-2 of the second pixel PX-2, data "10011000101", into which the default data DF "10" and the data "011000101" stored in the first reset memory RM-1 are combined, may be calculated as the reset value of the first pixel PX-1. In addition, data "10011100110", into which the default data DF "10", the high-order 3 bits of data, that is, "011", stored in the first reset memory RM-1, and the data "100110" stored in the second reset memory RM-2 are combined, may be calculated as the reset value of the second pixel PX-2.

As described with reference to FIGS. 3A to 3C, because the number of memory cells included in the second pixel PX-2 is less than the number of memory cells included in the first pixel PX-1, the area of the second pixel PX-2 may be less than the area of the first pixel PX-1. The area of the pixel array 110 according to some example embodiments of inventive concepts may be less than the area of a pixel array in which all the plurality of pixels PX are implemented by the first pixel PX. Therefore, the area of the pixel array 110 and the size of the image sensor (e.g. the size of the image sensor 100 of FIG. 1) including the pixel array 110 may be reduced.

Figure 4:
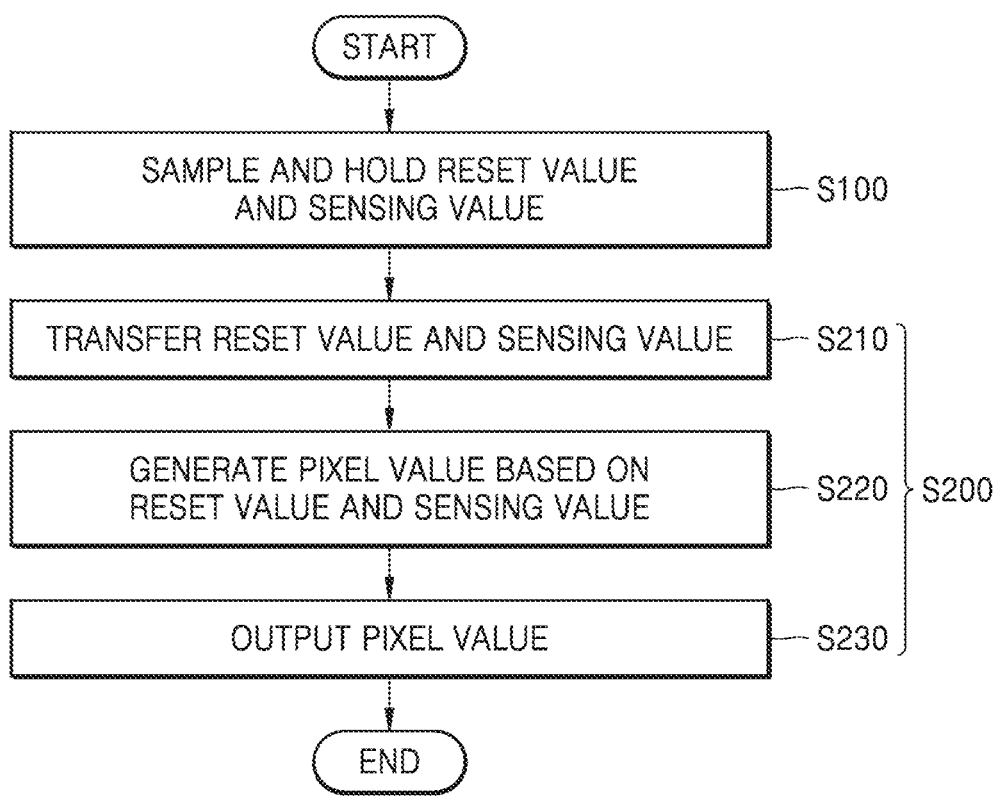
FIG. 4 is a flowchart illustrating an operation method of an image sensor, according to some example embodiments of inventive concepts.

FIG. 4 is a flowchart illustrating an operation method of an image sensor, according to some example embodiments of inventive concepts. The operation method of FIG. 4 may be performed by the image sensor 100 of FIG. 1 and will be described with further reference to FIGS. 1 and 2 in addition to FIG. 4.

Referring to FIG. 4, in operation S100, a reset value and a sensing value may be sampled and held (S100). The ADC 13 may sample the reset value and the sensing value from each of the plurality of pixels PX, and the sampled reset value and the sampled sensing value may be stored (held) in the memory 14. The sampling and holding of the reset value and the sensing value may be simultaneously performed on the plurality of pixels PX.

Next, in operation S200, an operation for each row of the pixel array 110 may be performed. Operations S210, S 220, and S230 may be simultaneously performed on respective reset values and respective sensing values of a plurality of pixels PX included in one row.

In operation S210, the reset value and the sensing value may be transferred. The reset value and the sensing value, which are stored in the memory 14 of the pixel PX, may be transferred to the latch circuit 131 of the read circuit 130.

In operation S220, a pixel value may be generated based on the reset value and the sensing value. The calculation circuit 132 may perform a calculation based on the reset value and the sensing value, which are stored in the latch circuit 131, and may generate the pixel value as a result of the calculation. For example, a value resulted by/associated with subtracting the reset value from the sensing value may be generated as the pixel value.

In operation S230, the pixel value may be output. The data bus 133 may sequentially output pixel values corresponding to one row.

While operation S210 is performed on one row, operation S220 and/or operation S230 may be simultaneously performed on another row having already undergone operation S210. For example, when a plurality of reset values and a plurality of sensing values of a plurality of pixels of a first row are read from the pixel array 110, and then, a plurality of reset values and a plurality of sensing values of a plurality of pixels of a second row are read from the pixel array 110, operation S210 may be performed on the pixels of the first row. Thereafter, while operation S210 is performed on the pixels of the second row, operation S220 and/or operation S230 may be performed on the pixels of the first row. As operation S230 is performed on pixels of the last row, pixel values corresponding to one frame of the pixel array 110, that is, image data, may be output.

Figure 5A:
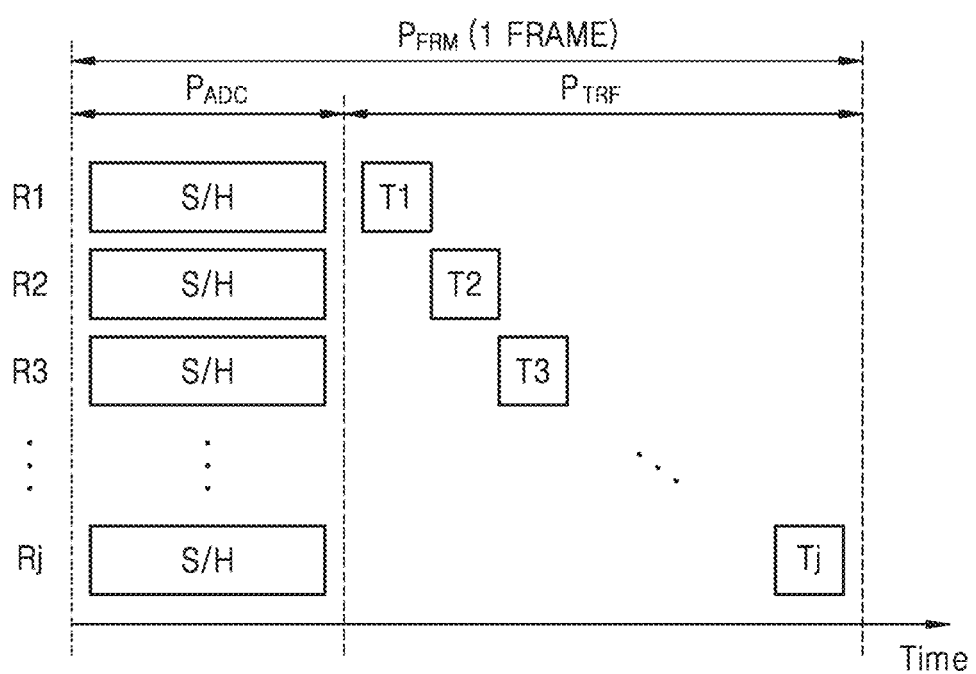
FIG. 5A is a timing diagram illustrating operations of a pixel array according to some example embodiments of inventive concepts.
Figure 5B:
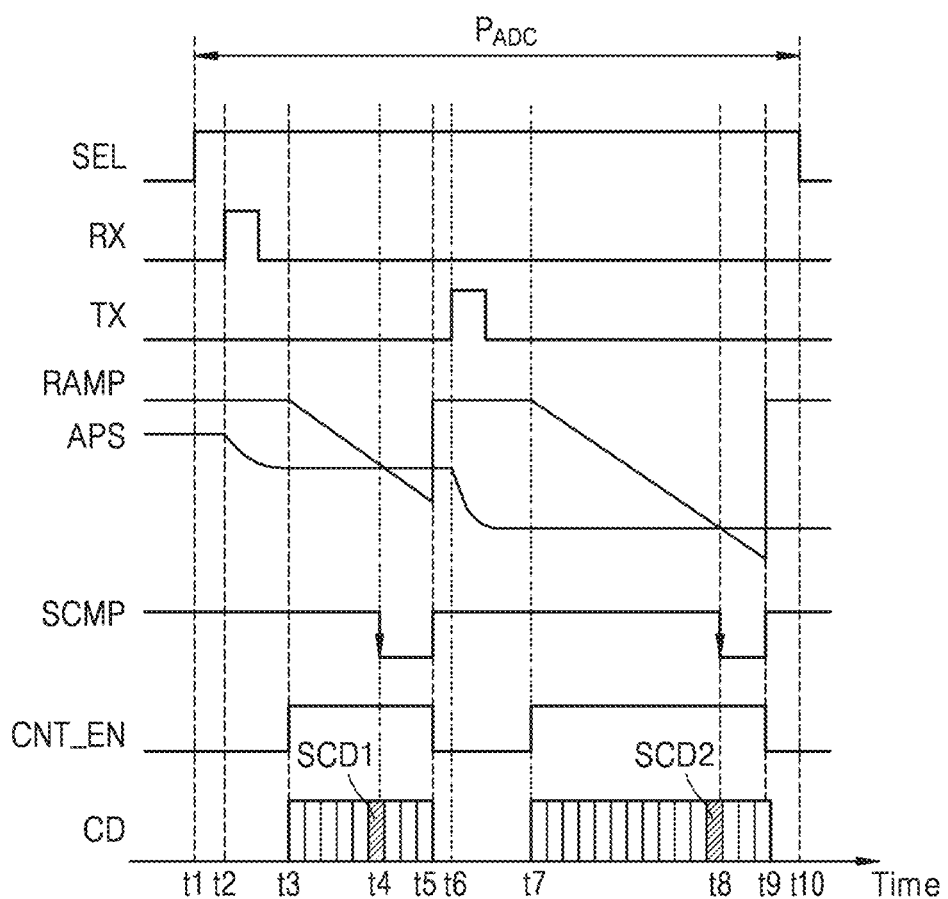
FIG. 5B is a timing diagram illustrating an ADC period of FIG. 5A in detail.

FIG. 5A is a timing diagram illustrating operations of a pixel array according to some example embodiments of inventive concepts, and FIG. 5B is a timing diagram illustrating an ADC period of FIG. 5A in detail. The operations of FIGS. 5A and 5B may be performed by the pixel array 110 of FIG. 1 and the pixel PX of FIG. 2. Accordingly, descriptions will be made with further reference to FIGS. 1 and 2 in addition to FIGS. 5A and 5B.

Referring to FIG. 5A, a frame period $P_{FRM}$ may include an ADC period $P_{ADC}$ and a transfer period $P_{TRF}$. The frame period $P_{FRM}$ may be a period in which a scan operation of one frame is performed on the pixel array 110. In the ADC period $P_{ADC}$, in the plurality of pixels PX of the pixel array 110, the ADC 13 may convert reset noise into a reset value, and may convert a sensing signal according to photocharges of the photodiode 11 into a sensing value, and the reset value and the sensing value may be respectively stored in the reset memory RM and the sensing memory SM. As such, in the ADC period $P_{ADC}$, a sampling and holding operation S/H may be performed on the reset noise and the sensing signal.

Next, in the transfer period $P_{TRF}$, the reset value and the sensing value may be transferred on the basis of each row of the pixel array 110. In a period T1, the reset value and the sensing value corresponding to each pixel PX of the first row R1 may be transferred to the read circuit 130 through the column line (e.g. column line CL of FIG. 1). In addition, in a period T2, the reset value and the sensing value of each pixel PX of the second row R2 may be transferred to the read circuit 130 through the column line CL. As such, the reset values and the sensing values of the first to $j^{-th}$ rows R1 to Rj may be transferred. Each row may include a plurality of pixels PX. A plurality of reset values and a plurality of sensing values, which correspond to the plurality of pixels PX, may be simultaneously transferred.

Assuming that each pixel PX of the first row R1 is implemented by the first pixel PX-1 and each pixel PX of the other rows, for example, the second to $j^{-th}$ rows R2 to Rj, is implemented by the second pixel PX-2, the number of bits of the reset value stored in the second pixel PX-2 of the second to $j^{-th}$ rows R2 to Rj is less than the number of bits of the reset value stored in the first pixel PX-1 of the first row R1. Accordingly, the amount of data to be transferred in each of the periods T2 to Tj is less than the amount of data to be transferred in the period T1. Therefore, each of the periods T2 to Tj may be shorter than the period T1.

For example, when the pixel array 110 includes 1225 rows, when the first pixel PX-1 is arranged in a first row and the second pixel PX-2 is arranged in the other 1224 rows, and when the transfer time of the reset value and the sensing value of the first pixel PX-1 is 1 microsecond (µs) and the transfer time of the reset value and the sensing value of the second pixel PX-2 is 0.8 µs, the total transfer time of the reset values and the sensing values of the 1225 rows may be approximately 980 µs. As a comparative example, when the first pixel PX-1 is arranged in all the 1225 rows of the pixel array 110, the total transfer time of the reset values and the sensing values of the 1225 rows is 1225 µs. Therefore, the frame period $P_{FRM}$ of the pixel array 110 according to some example embodiments of inventive concepts may be shorter than/less than the frame period $P_{FRM}$ of the pixel array according to the comparative example, and a frame rate of the pixel array 110 may be increased as compared with a frame rate of the pixel array according to the comparative example.

Referring to FIG. 5B, from a time point t1 to a time point t10, the select control signal SEL may have an activation level, e.g., logic high, and here, a reset value and a sensing value may be generated and stored.

When, at a time point t2, the reset control signal RS is transited to an activation level, for example, logic high, the reset transistor RX may reset the floating diffusion node FD based on the power supply voltage VDD, according to the reset control signal RS. A reset signal may be output as the analog pixel signal APS. From the time point t3 to the time point t5, the ramp signal RAMP may decrease, and the count enable signal CNT_EN may have an activation level, for example, logic high. The counter block 140 may generate the counting code CD when the count enable signal CNT_EN is in logic high. A value of the counting code CD may increase with the lapse of time.

At the time point t4, the ramp signal RAMP may be equal to the analog pixel signal APS, and, thereafter, the ramp signal RAMP may be lower than the analog pixel signal APS. At the time point t4, an output of the comparator CMP, for example, a comparison signal SCMP, may be transited from logic high to logic low. The sampling circuit SC may sample the counting code CD in response to a falling edge of the comparison signal SCMP. A sampled first code SCD1 may be stored as a reset value in the reset memory RM. At the time point t5, the ramp signal RAMP and the counting code CD may be reset. For example, the counting code CD may be reset to a code value of or corresponding to '0'. The comparison signal SCMP may be transited from logic low to logic high.

Next, at the time point t6, when the transfer control signal TX is transited to an activation level, for example, logic high, the transfer transistor TX may transfer photocharges to the floating diffusion node FD. A sensing signal corresponding to the voltage level of the floating diffusion node FD may output as the analog pixel signal APS. For example, the analog pixel signal APS may decrease, and as the amount of light incident upon the photodiode 11 increases, the analog pixel signal APS may decrease up to a lower level.

From the time point t7 to the time point t9, the ramp signal RAMP may decrease, and the count enable signal CNT_EN may have an activation level, for example, logic high. The counter block 140 may generate the counting code CD when the count enable signal CNT_EN is in logic high.

At the time point t8, the ramp signal RAMP may be equal to the analog pixel signal APS, and thereafter, the ramp signal RAMP may be lower than the analog pixel signal APS. At the time point t8, the comparison signal SCMP may be transited from logic high to logic low. The sampling circuit SC may sample the counting code CD in response to a falling edge of the comparison signal SCMP. A sampled second code SCD2 may be stored as a sensing value in the sensing memory SM. In this manner, the reset signal and the sensing signal may be sampled from the pixel PX, thereby generating the reset value and the sensing value, and the reset value and the sensing value may be held, that is, be stored, in the memory 14.

Figure 6A:
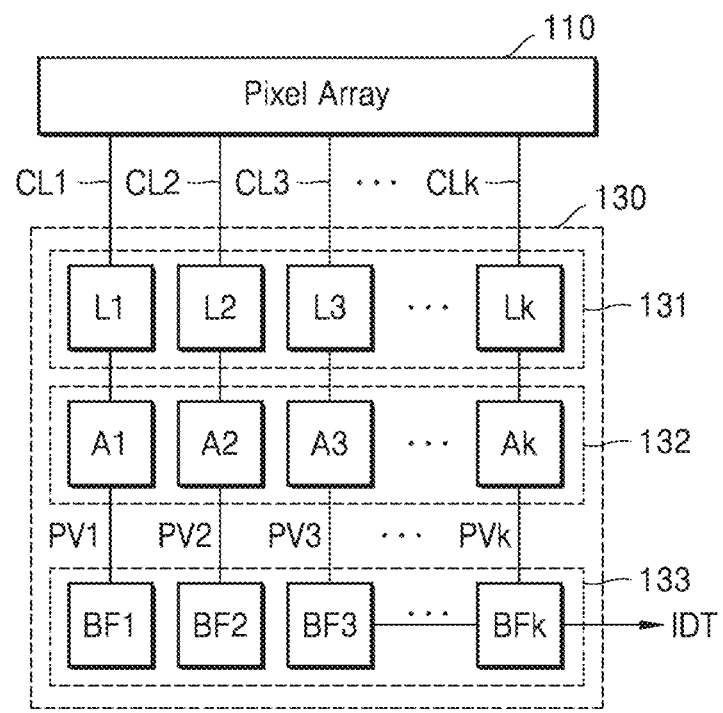
FIG. 6A is a block diagram illustrating a read circuit according to some example embodiments of inventive concepts.
Figure 6B:
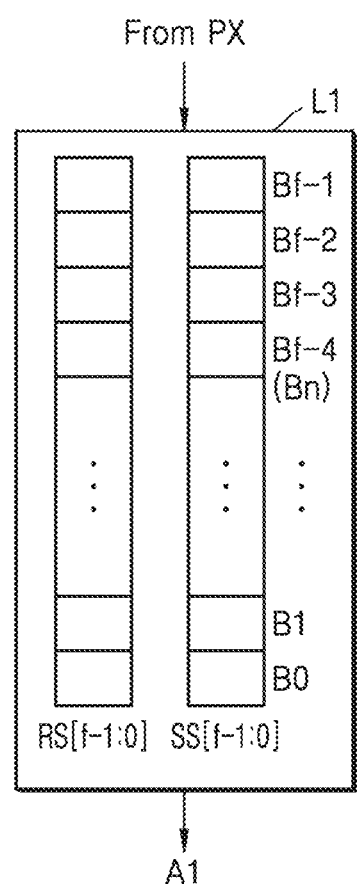
FIG. 6B is a circuit diagram illustrating an example of a latch of FIG. 6A.

FIG. 6A is a block diagram illustrating a read circuit according to some example embodiments of inventive concepts, and FIG. 6B is a circuit diagram illustrating an example of a latch of FIG. 6A.

Referring to FIG. 6A, the read circuit 130 may include the latch circuit 131, the calculation circuit 132, and the data bus 133, the latch circuit 131 may include a plurality of latches, for example, first to $k^{-th}$ latches L1 to Lk, the calculation circuit 132 may include a plurality of calculators, for example, first to $k^{-th}$ calculators A1 to Ak, and the data bus 133 may include a plurality of buffers, for example, first to $k^{-th}$ buffers BF1 to BFk.

Reset values and sensing values may be received, on the basis of each row of the pixel array 110, through each of first to $k^{-th}$ column lines CL1 to CLk, and the first to $k^{-th}$ latches L1 to Lk may store the reset values and the sensing values received through each of the first to $k^{-th}$ column lines CL1 to CLk. For example, the reset value and the sensing value received through the first column line CL1 may be stored in the first latch L1.

A plurality of reset values and a plurality of sensing values, which are stored in the first to $k^{-th}$ latches L1 to Lk, may be transferred to the first to $k^{-th}$ calculators A1 to Ak, and the first to $k^{-th}$ calculators A1 to Ak may calculate the respective reset values and the respective sensing values, which are received, and thus respectively generate a plurality of pixel values, for example, first to $k^{-th}$ pixel values PV1 to PVk.

The first to $k^{-th}$ pixel values PV1 to PVk may be transferred to the first to $k^{-th}$ buffers BF1 to BFk and, after temporarily being stored in the first to $k^{-th}$ buffers BF1 to BFk, the first to $k^{-th}$ pixel values PV1 to PVk may be sequentially output. The first to $k^{-th}$ pixel values PV1 to PVk respectively corresponding to the plurality of rows of the pixel array 110 are output, whereby the image data IDT of one frame may be output.

In the read circuit 130, the latch, the calculator, and the buffer, which correspond to each column, may form or correspond to one channel (alternatively referred to as a data path). For example, the first latch L1, the first calculator A1, and the first buffer BF1 may form/correspond to a first channel, and the reset value and the sensing value received through the first column CL1 may be processed by the first channel corresponding thereto, and thus generated into the first pixel value PV1.

Referring to FIG. 6B, each latch, for example, the first latch L1, may include a reset sub-latch RS[f-1:0] and a sensing sub-latch SS[f-1:0], each including f bits (or cells), for example, first to $f^{th}$ bits B0 to Bf-1. The reset value received from each pixel PX may be stored in the reset sub-latch RS[f-1:0], and the sensing value received from each pixel PX may be stored in the sensing sub-latch SS[f-1:0].

As described above with reference to FIG. 3, in the first pixel PX-1 and the second pixel PX-2, the number of bits of the reset value stored in the reset memory RM may be less than or equal to the number, e.g., f, of bits of the sensing value stored in the sensing memory SM. When an f-bit reset value is stored in the reset memory RM and an f-bit sensing value is stored in the sensing memory SM, the reset value output from the pixel PX may be stored in f bits, e.g., the first to $f^{th}$ bits B0 to Bf-1, of the reset sub-latch RS[f-1:0] and the sensing value output from the pixel PX may be stored in f bits of the sensing sub-latch SS[f-1:0]. When an n-bit reset value (where n is a natural number less than f) is stored in the reset memory RM and an f-bit sensing value is stored in the sensing memory SM, the reset value output from the pixel PX may be stored in low-order/less significant n bits, for example, the first to $n^{th}$ bits B0 to Bn, of the reset sub-latch RS[f-1:0] and the sensing value output from the pixel PX may be stored in f bits, that is, the first to $f^{th}$ bits B0 to Bf-1 of the sensing sub-latch SS[f-1:0].

FIG. 7 is a diagram illustrating an example of an operation method of a latch, according to some example embodiments of inventive concepts. In FIG. 7, it is assumed that the first row R1 of the pixel array includes the first pixel PX-1 and that the second row R2 and the third row R3 each include the second pixel PX-2.

Descriptions will be made by taking the first latch L1 of the latch circuit (131 of FIG. 6A) as an example. Configurations and operations of the other latches, for example, the second to $f^{th}$ latches L2 to Lk, of the latch circuit 131 are the same as or similar to those of the first latch L1.

Referring to FIG. 7, the first latch L1 may include a reset sub-latch RS[10:0] and a sensing sub-latch SS[10:0], each including 11 bits, for example, first to eleventh bits B0 to B10.

An 11-bit reset value and an 11-bit sensing value may be received from the first pixel PX-1 of the first row R1, and the reset value and the sensing value may be respectively stored in the reset sub-latch RS[10:0] and the sensing sub-latch SS[10:0]. The 11-bit data values, e.g., the reset value and the sensing value, respectively stored in the reset sub-latch RS[10:0] and the sensing sub-latch SS[10:0] may be provided to the first calculator A1.

Next, a 6-bit reset value and an 11-bit sensing value may be received from the second pixel PX-2 of the second row R2. Low-order 6 bits, e.g., the first to sixth bits B0 to B5, of the reset sub-latch RS[10:0] may be updated based on the received reset value of the second pixel PX-2 of the second row R2. High-order 5 bits, e.g., the seventh to eleventh bits B6 to B10, of the reset sub-latch RS[10:0] may maintain a previous value, e.g., data corresponding to high-order 5 bits of the reset value of the first pixel PX-1 of the first row R1. A data value according to the 11 bits stored in the reset sub-latch RS[10:0] may be set as a modified reset value.

The 11 bits of the sensing sub-latch SS[10:0] may be updated based on the sensing value received from the second pixel PX-2 of the second row R2. The 11-bit data values, that is, the modified reset value and the sensing value, respectively stored in the reset sub-latch RS[10:0] and the sensing sub-latch SS[10:0] may be provided to the first calculator A1.

Next, a 6-bit reset value and an 11-bit sensing value may be received from the second pixel PX-2 of the third row R3. Low-order 6 bits, e.g., the first to sixth bits B0 to B5, of the reset sub-latch RS[10:0] may be updated based on the reset value of the second pixel PX-2 of the third row R3. High-order 5 bits, e.g., the seventh to eleventh bits B6 to B10, of the reset sub-latch RS[10:0] may maintain a previous value, that is, data corresponding to high-order 5 bits of the reset value of the first pixel PX-1 of the first row R1. A data value according to the 11 bits stored in the reset sub-latch RS[10:0] may be set as a modified reset value.

The 11 bits of the sensing sub-latch SS[10:0] may be updated based on the sensing value received from the second pixel PX-2 of the third row R3. The 11-bit data values, e.g., the modified reset value and the sensing value, respectively stored in the reset sub-latch RS[10:0] and the sensing sub-latch SS[10:0] may be provided to the first calculator A1.

By the above-described operations of the latch, for example, the first latch L1, at least one high-order bit, for example, high-order 5 bits, of the reset value received from the first pixel PX-1 may be used as high-order 5 bits of the modified reset value of the second pixel PX-2 of the other rows.

Figure 8:
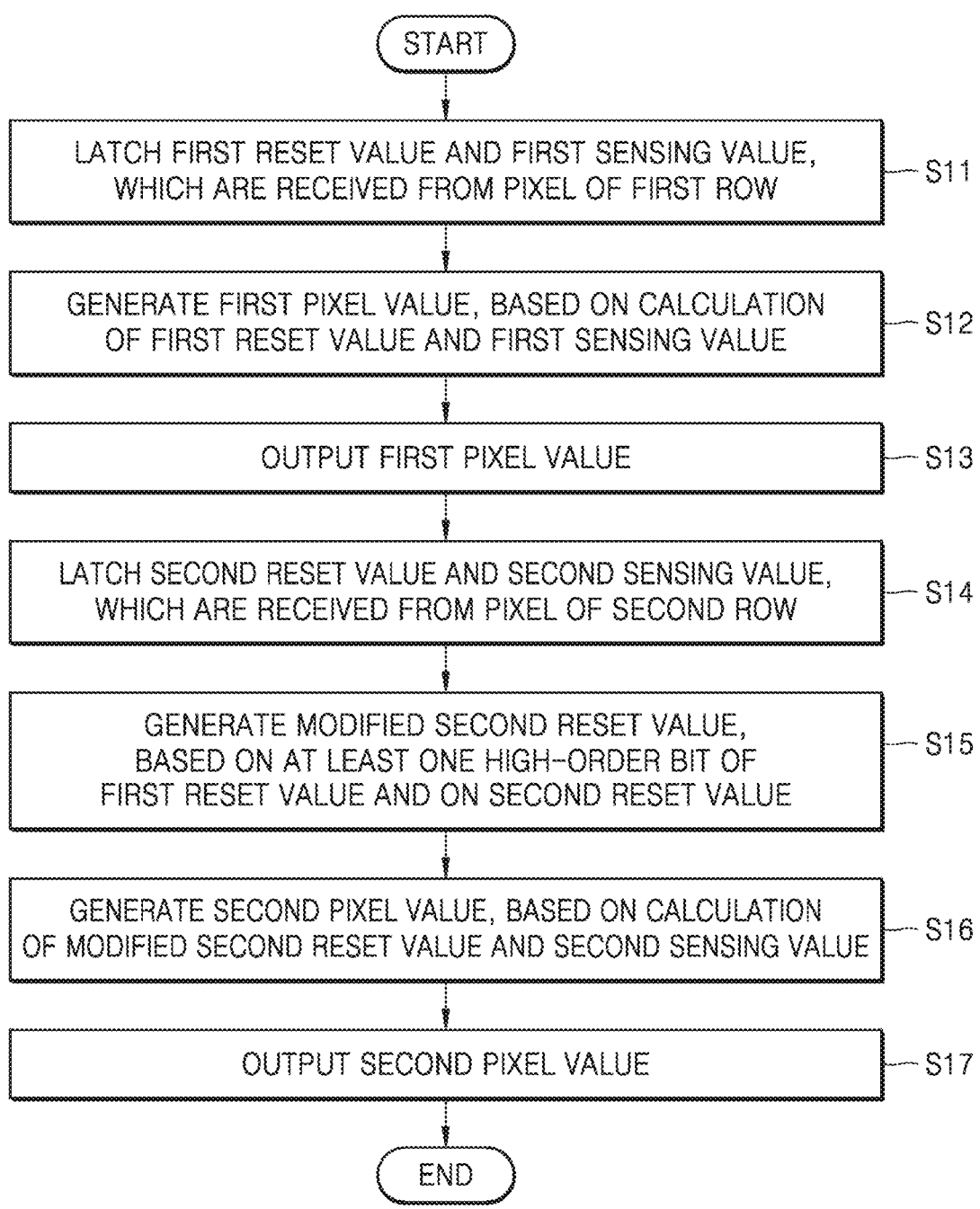
FIG. 8 is a flowchart illustrating an operation method of a read circuit, according to some example embodiments of inventive concepts.

FIG. 8 is a flowchart illustrating an operation method of a read circuit, according to some example embodiments of inventive concepts.

Referring to FIG. 8, in operation S11, a first reset value and a first sensing value, which are received from a pixel of a first row, may be latched. The pixel of the first row is assumed to be implemented by a first pixel and that the number of bits of a reset memory is equal to the number of bits of a sensing memory. The first reset value and the first sensing value may be respectively stored in a reset sub-latch and a sensing sub-latch of a latch.

In operation S12, a first pixel value may be generated based on a calculation of the first reset value and the first sensing value. For example, a calculator may subtract the first reset value, which is received from the reset sub-latch of the latch, from the first sensing value, which is received from the sensing sub-latch of the latch, and may generate the first pixel value based on the subtraction.

In operation S13, a data bus may output the first pixel value. The data bus may output a plurality of first pixel values corresponding to the first row of the pixel array.

In operation S14, a second reset value and a second sensing value, which are received from a pixel of a second row, may be latched. The pixel of the second row is assumed to be implemented by a second pixel. The reset sub-latch and the sensing sub-latch of the latch may be updated based on the second reset value and the second sensing value, respectively. The number of bits of the received reset value is less than the number of bits of the reset sub-latch. Low-order bits of the reset sub-latch may be updated based on the received reset value.

In operation S15, a modified second reset value may be generated, based on at least one high-order bit of the first reset value, which has already been stored in the reset sub-latch, and on the second reset value. At least one bit of the reset sub-latch may maintain intact the at least one high-order bit of the first reset value already stored, without being updated. Accordingly, the reset sub-latch may store the at least one high-order bit of the first reset value and store the second reset value, and thus, the modified second reset value may be generated.

In operation S16, a second pixel value may be generated based on a calculation of the modified second reset value and the second sensing value. For example, the calculator may subtract the modified second reset value, which is received from the reset sub-latch of the latch, from the second sensing value, which is received from the sensing sub-latch of the latch, and may generate the second pixel value based on the result of the subtraction.

In operation S17, the data bus may output the second pixel value. The data bus may output a plurality of second pixel values corresponding to the second row of the pixel array.

In the flowchart of FIG. 8, while operations S12 and S13 are performed, operations S14 to S16 may be performed. For example, data of one row and data of the next row may be processed in a pipelining manner.

Figure 9:
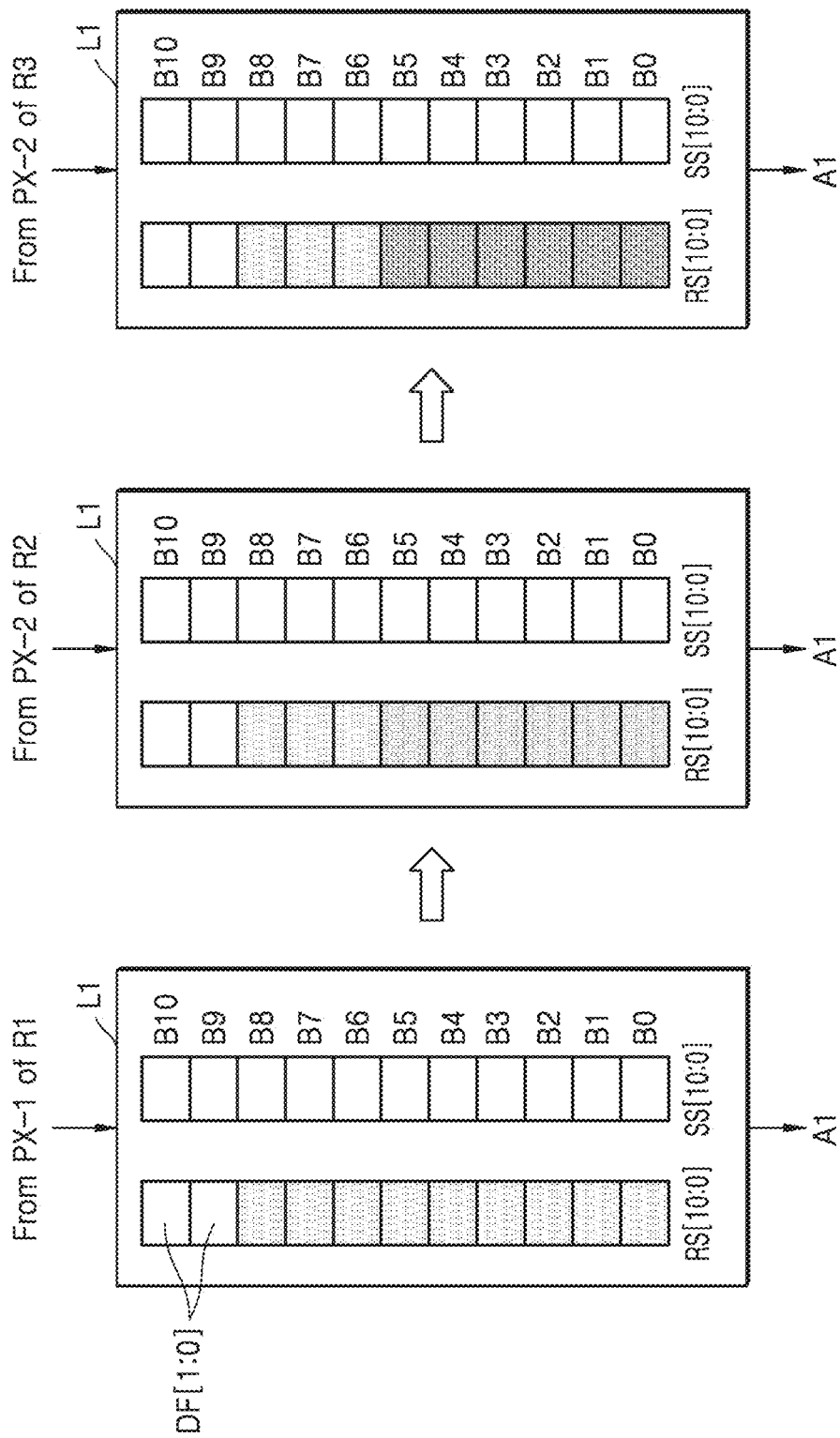
FIG. 9 is a diagram illustrating an example of an operation method of a latch, according to some example embodiments of inventive concepts.

FIG. 9 is a diagram illustrating an example of an operation method of a latch, according to some example embodiments of inventive concepts. In FIG. 9, the first row R1 of the pixel array is assumed to include the first pixel PX-1, the second row R2 and the third row R3 are assumed to each include the second pixel PX-2, and number of bits of the reset memory of the first pixel PX-1 is assumed to be less than the number of bits of the sensing memory thereof.

Descriptions will be made by taking the first latch L1 of the latch circuit (131 of FIG. 6A) as an example. The configurations and operations of the other latches, for example, the second to $r^{-th}$ latches L2 to Lk, of the latch circuit 131 are the same as those of the first latch L1.

Referring to FIG. 9, the first latch L1 may include the reset sub-latch RS[10:0] and the sensing sub-latch SS[10:0], each including 11 bits, for example, the first to eleventh bits B0 to B10.

As a non-limiting example, a 9-bit reset value and an 11-bit sensing value may be received from the first pixel PX-1 of the first row R1, and the sensing value may be stored in low-order 9 bits, for example, the first to ninth bits B0 to B8, of the reset sub-latch RS[10:0]. 2 bits of default data DF[1:0] may be stored, in advance, in high-order 2 bits, for example, the tenth and eleventh bits B9 and B10, of the reset sub-latch RS[10:0]. A data value according to the 11 bits stored in the reset sub-latch RS[10:0] may be set as a modified reset value. The 11-bit sensing value may be stored in the sensing sub-latch SS[10:0]. Although example embodiments are described with reference to a 9-bit reset value and an 11-bit sensing value, example embodiments are not limited thereto, and a number of bits The 11-bit data values, for example, the modified reset value and the sensing value, respectively stored in the reset sub-latch RS[10:0] and the sensing sub-latch SS[10:0] may be provided to the first calculator A1.

Next, a 6-bit reset value and an 11-bit sensing value may be received from the second pixel PX-2 of the second row R2. Low-order 6 bits, for example, the first to sixth bits B0 to B5, of the reset sub-latch RS[10:0] may be updated based on the received reset value of the second pixel PX-2 of the second row R2. High-order 2 bits, that is, the tenth and eleventh bits B9 and B10, of the reset sub-latch RS[10:0] may maintain a previous value, for example, the default data DF[1:0], and middle-order 3 bits thereof, that is, the seventh to ninth bits B6 to B8 thereof, may maintain data corresponding to high-order 3 bits of the reset value of the first pixel PX-1 of the first row R1. A data value according to the 11 bits stored in the reset sub-latch RS[10:0] may be set as a modified reset value.

The 11 bits of the sensing sub-latch SS[10:0] may be updated based on the sensing value received from the second pixel PX-2 of the second row R2. The 11-bit data values, that is, the modified reset value and the sensing value, respectively stored in the reset sub-latch RS[10:0] and the sensing sub-latch SS[10:0] may be provided to the first calculator A1.

Next, a 6-bit reset value and an 11-bit sensing value may be received from the second pixel PX-2 of the third row R3. The low-order 6 bits, for example, the first to sixth bits B0 to B5, of the reset sub-latch RS[10:0] may be updated based on the received reset value of the second pixel PX-2 of the third row R3. The high-order 2 bits, for example, the tenth and eleventh bits B9 and B10, of the reset sub-latch RS[10:0], may maintain a previous value, that is, the default data DF[1:0], and the middle-order 3 bits thereof, for example, the seventh to ninth bits B6 to B8 thereof, may maintain the data corresponding to the high-order 3 bits of the reset value of the first pixel PX-1 of the first row R1. A data value according to the 11 bits stored in the reset sub-latch RS[10:0] may be set as a modified reset value.

The 11 bits of the sensing sub-latch SS[10:0] may be updated based on the sensing value received from the second pixel PX-2 of the third row R3. The 11-bit data values, for example, the modified reset value and the sensing value, respectively stored in the reset sub-latch RS[10:0] and the sensing sub-latch SS[10:0] may be provided to the first calculator A1.

By the above-described operations of the latch, for example, the first latch L1, the default data may be used as high-order 2 bits of the modified reset value of the first pixel PX-1. Alternatively or additionally, the default data, and at least one high-order bit, for example, high-order 3 bits, of the reset value received from the first pixel PX-1 may be used as high-order 5 bits of the modified reset value of the second pixel PX-2 of the other rows.

Figure 10:
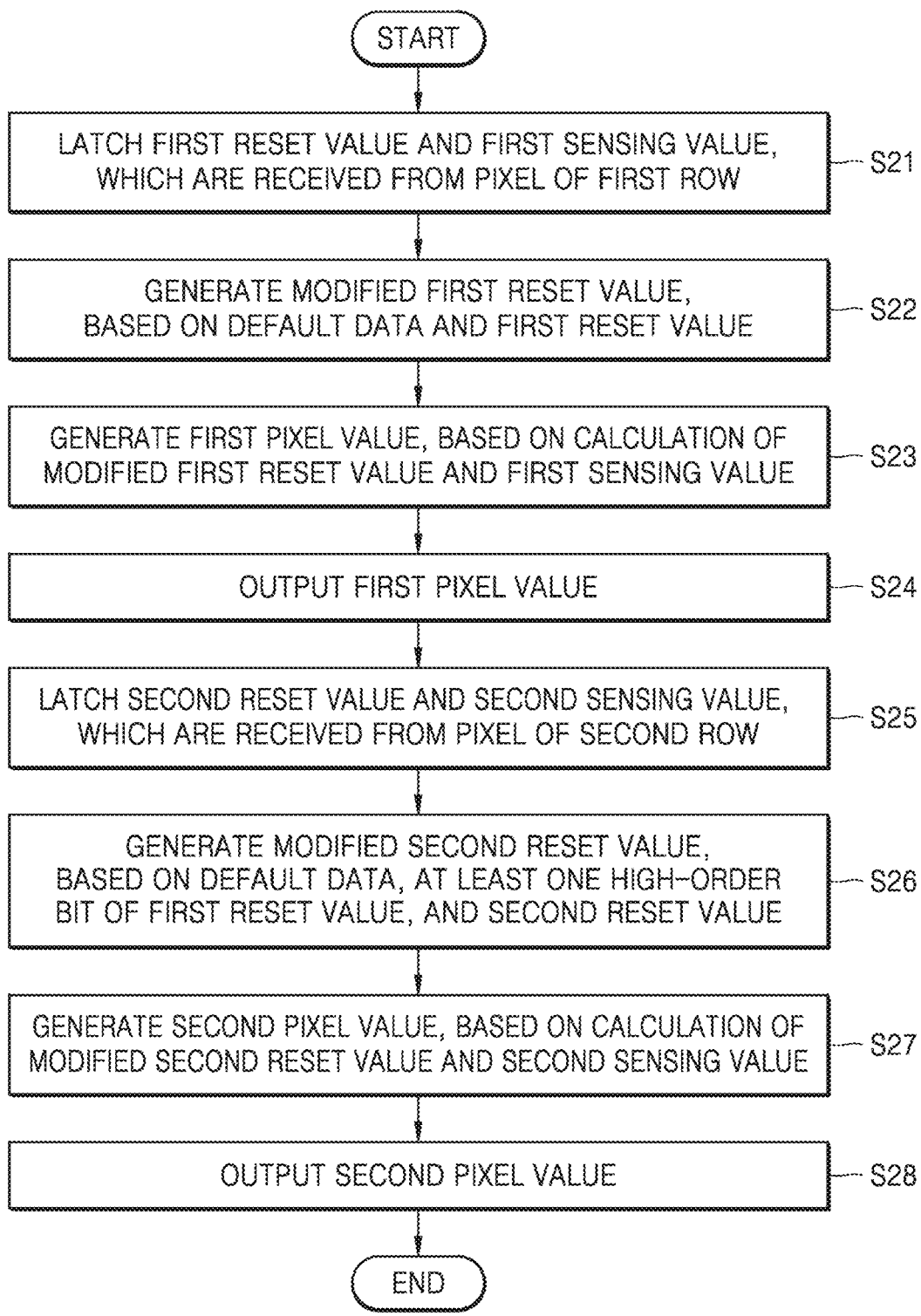
FIG. 10 is a flowchart illustrating an operation method of a read circuit, according to some example embodiments of inventive concepts.

FIG. 10 is a flowchart illustrating an operation method of a read circuit, according to some example embodiments of inventive concepts.

Referring to FIG. 10, in operation S21, a first reset value and a first sensing value, which are received from a pixel of a first row, may be latched. It is assumed that the pixel of the first row may be implemented by a first pixel and that the number of bits of a reset memory is less than the number of bits of a sensing memory. The first reset value may be stored in low-order bits of a reset sub-latch, and the first sensing value may be stored in a sensing sub-latch.

In operation S22, a modified first reset value may be generated based on default data and the first reset value. The default data may be stored, in advance, in at least one bit of the reset sub-latch. In an example embodiment, the default data may be stored in advance, for example, before the first reset value is received. Accordingly, the reset sub-latch may store the default data and the first reset value, and thus, the modified first reset value may be generated. In some example embodiments, the default data may be generated and/or adjusted dynamically, based on operation of the image sensor 100.

In operation S23, a first pixel value may be generated based on the modified first reset value and the first sensing value. For example, a calculator may subtract the modified first reset value, which is received from the reset sub-latch of the latch, from the first sensing value, which is received from the sensing sub-latch of the latch, and may generate the first pixel value based on the subtraction.

In operation S24, a data bus may output the first pixel value. The data bus may output a plurality of first pixel values corresponding to the first row of the pixel array.

In operation S25, a second reset value and a second sensing value, which are received from a pixel of a second row, may be latched. The pixel of the second row is assumed to be implemented by a second pixel. The reset sub-latch and the sensing sub-latch of the latch may be updated based on the second reset value and the second sensing value, respectively. The number of bits of the received reset value is less than the number of bits of the reset sub-latch. Low-order bits of the reset sub-latch may be updated based on the received reset value.

In operation S26, a modified second reset value may be generated, based on the default data already stored in the reset sub-latch, at least one high-order bit of the first reset value, and the second reset value. At least two bits of the reset sub-latch may maintain intact the default data already stored and the at least one high-order bit of the first reset value, without being updated. Accordingly, the reset sub-latch may store the default data, the at least one high-order bit of the first reset value, and the second reset value, and thus, the modified second reset value may be generated.

In operation S27, a second pixel value may be generated based on a calculation of the modified second reset value and the second sensing value. For example, the calculator may subtract the modified second reset value, which is received from the reset sub-latch of the latch, from the second sensing value, which is received from the sensing sub-latch of the latch, and may generate the second pixel value based on the subtraction.

In operation S28, the data bus may output the second pixel value. The data bus may output a plurality of second pixel values corresponding to the second row of the pixel array.

Figure 11A:
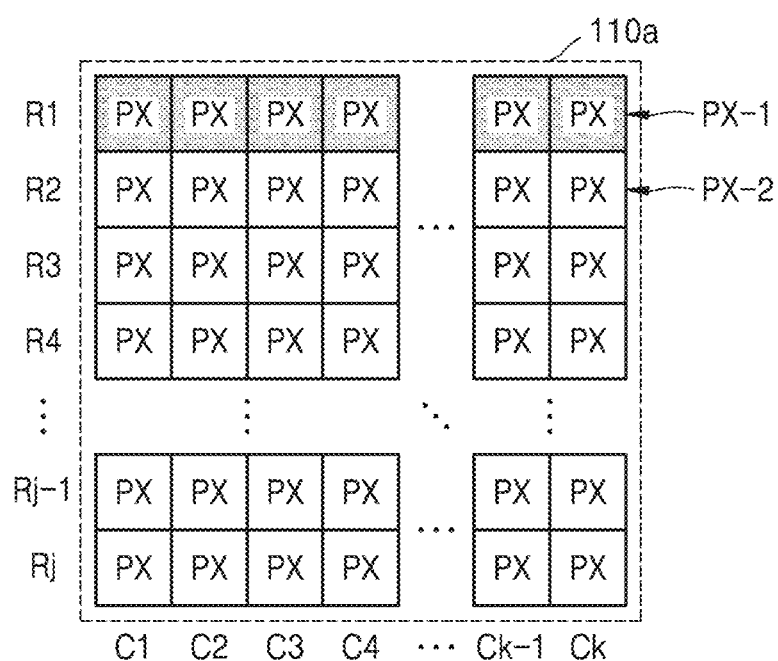
FIGS. 11A and 11B each illustrate an arrangement of a first pixel and a second pixel in a pixel array, according to some example embodiments of inventive concepts.
Figure 11B:
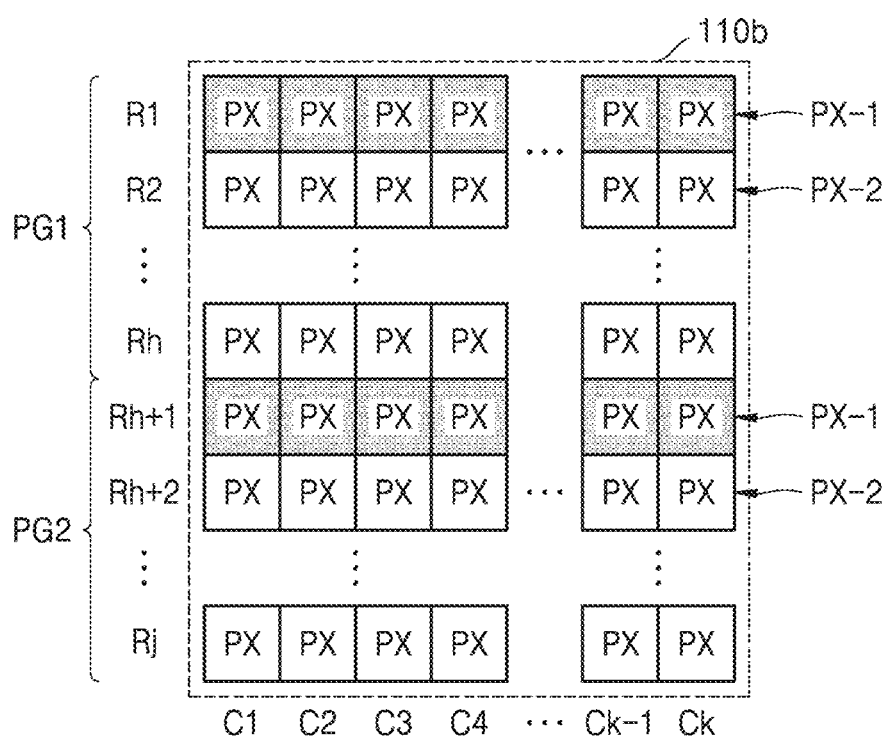

FIGS. 11A and 11B each illustrate an arrangement of a first pixel and a second pixel in a pixel array, according to some example embodiments of inventive concepts.

Referring to FIG. 11A, a pixel array 110a may include a plurality of pixels PX arranged in first to $j^{-th}$ rows R1 to Rj and first to $k^{-th}$ columns. Here, each of the plurality of pixels PX of the first row R1 may be implemented by the first pixel PX-1, and each of the plurality of pixels PX of the other rows, for example, the second to $j^{-th}$ rows R2 to Rj, may be implemented by the second pixel PX-2. Accordingly, at least one high-order bit of the reset value of each pixel PX of the first row R1 may be used as at least one high-order bit of the reset value of each pixel PX of the other rows.

Referring to FIG. 11B, a pixel array 110b may include a plurality of pixels PX arranged in first to $j^{-th}$ rows R1 to Rj and first to $k^{-th}$ columns, the pixels of the first to $h^{-th}$ rows R1 to Rh may be grouped into a first pixel group PG1, and the pixels of the $h+1^{-th}$ to $j^{-th}$ rows Rh+1 to Rj may be grouped into a second pixel group PG2.

Each of the plurality of pixels PX of the uppermost row, for example, the first row R1, in the first pixel group PG1 may be implemented by the first pixel PX-1, and others of the plurality of pixels PX of the other rows, for example, the second to $h^{-th}$ rows R2 to Rh in the first pixel group PG1, may be implemented by the second pixel PX-2. Accordingly, at least one high-order bit of the reset value of each pixel PX of the first row R1 may be used as at least one high-order bit of the reset value of each pixel PX of the other rows.

Each of the plurality of pixels PX of the uppermost row, for example, the $h+1^{-th}$ row Rh+1, in the second pixel group PG2 may be implemented by the first pixel PX-1, and others of the plurality of pixels PX of the other rows, for example, the $h+2^{-th}$ to $j^{-th}$ rows Rh+2 to Rj of the second pixel group PG2, may be implemented by the second pixel PX-2. Accordingly, at least one high-order bit of the reset value of each pixel PX of the $h+1^{-th}$ row Rh+1 may be used as at least one high-order bit of the reset value of each pixel PX of the other rows of the second pixel group PG2. The number of high-order bits of the reset value of each pixel PX-1 of the first row of the first pixel group PG1 may be the same as, or different from, the number of high-order bits of the reset value of each pixel PX-1 of the first row of the second pixel group PG2.

In the pixel array 110b, the reset value may vary according to a position in the pixel array 110b. To generate a more accurate reset value, the plurality of pixels PX may be grouped on the basis of positions thereof, and at least one high-order bit of the reset value of the first pixel PX-1 in each group may be used as at least one high-order bit of the reset value of the other pixels, that is, the second pixel PX-2.

Although FIG. 11B illustrates that the pixel array 110b is grouped into two pixel groups, that is, PG1 and PG2, inventive concepts are not limited thereto, and the pixel array 110b may be grouped into three or more pixel groups, the plurality of pixels PX of the uppermost row in each group may be implemented by the first pixel PX-1, and the plurality of pixels PX of the other rows may be implemented by the second pixel PX-2.

Figure 12A:
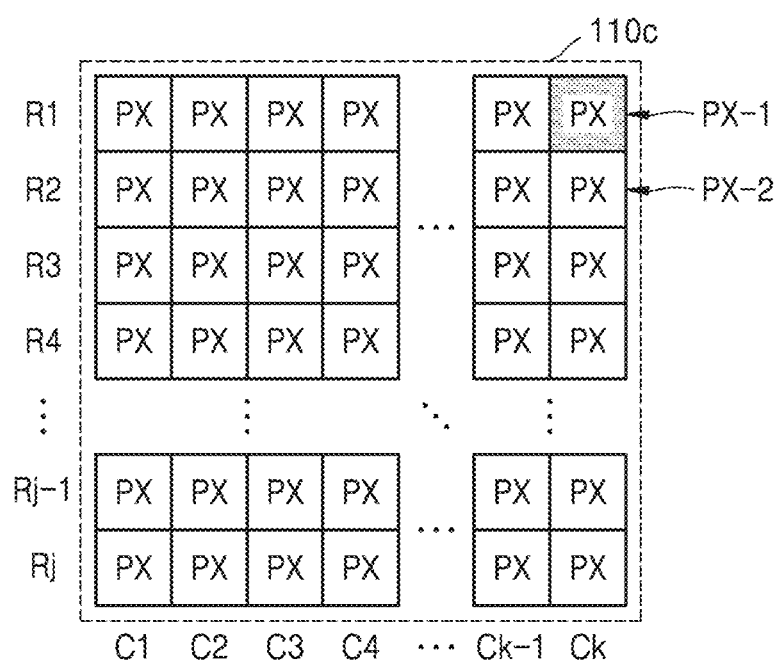
FIGS. 12A to 12C each illustrate an arrangement of a first pixel and a second pixel in a pixel array, according to some example embodiments of inventive concepts.
Figure 12B:
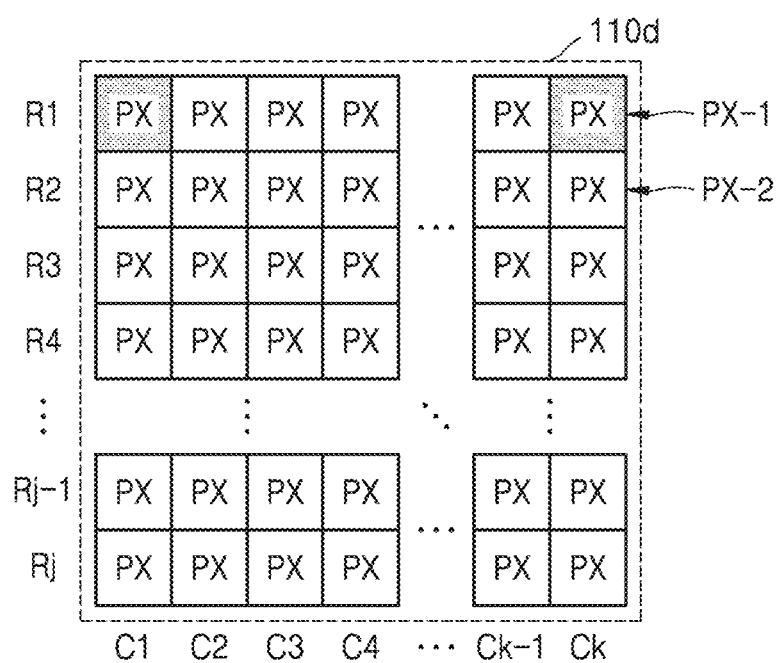
Figure 12C:
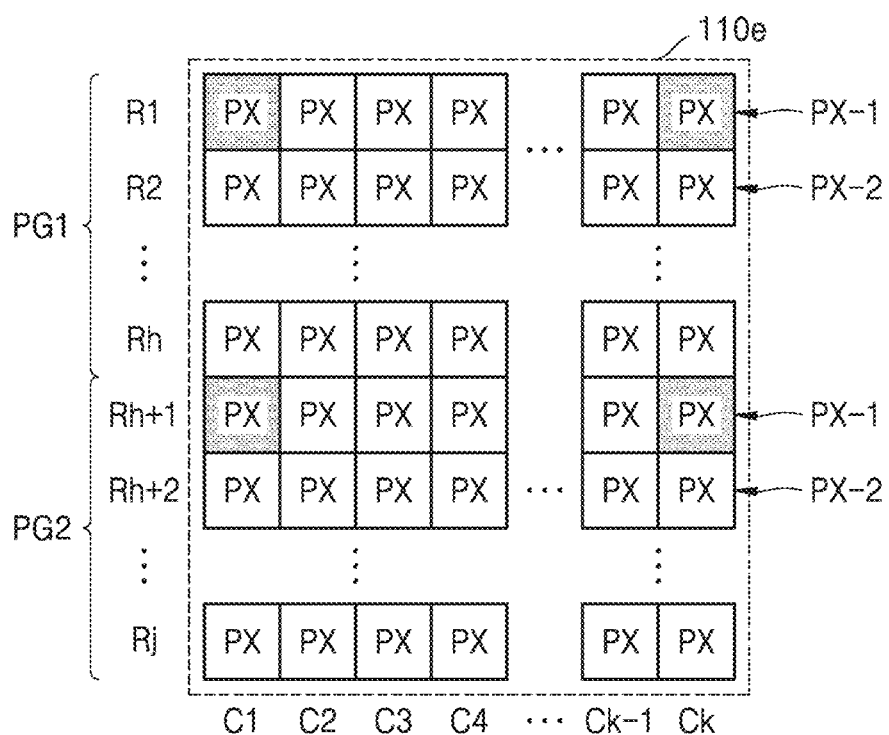

FIGS. 12A to 12C each illustrate an arrangement of a first pixel and a second pixel in a pixel array, according to some example embodiments of inventive concepts.

In FIGS. 12A to 12C, not all of a plurality of pixels of one row but some pixels thereof, for example, one or more pixels thereof, may be implemented by the first pixel PX-1.

Referring to FIG. 12A, in the first row R1 of a pixel array 110c, one pixel PX located at a side, for example, the pixel PX of the $k^{-th}$ column Ck, may be implemented by the first pixel PX-1. Accordingly, at least one high-order bit of the reset value of the first pixel PX-1 located in the $k^{-th}$ column Ck of the first row R1 may be used as at least one high-order bit of the reset value of the other pixels PX of the first row R1, for example, the second pixels PX-2 arranged in the first to $k-1^{-th}$ columns C1 to Ck-1 of the first row R1, and may also be used as at least one high-order bit of the reset value of the second pixels PX-2 arranged in the other rows.

Referring to FIG. 12B, in the first row R1 of a pixel array 110d, two pixels located at both sides, for example, the pixel PX of the first column C1 and the pixel PX of the k-th column Ck, may be implemented by the first pixel PX-1.

Accordingly, at least one high-order bit of the reset value of the first pixel PX-1 located in the first column C1 of the first row R1 may be used as at least one high-order bit of the reset value of a plurality of second pixels PX-2 located on the left in the first row R1, and at least one high-order bit of the reset value of the first pixel PX-1 located in the $k^{-th}$ column Ck may be used as at least one high-order bit of the reset value of a plurality of second pixels PX-2 located on the right in the first row R1.

Referring to FIG. 12C, the plurality of pixels PX of a pixel array 110e may be grouped into the first pixel group PG1 and the second pixel group PG2, the pixels PX located on both sides in the uppermost row in each group, for example, the pixels PX located at both sides in the first row R1 and the $h+1^{-th}$ row Rh+1, may be implemented by the first pixel PX-1, and the other pixels PX therein may be implemented by the second pixel PX-2.

Although FIG. 12C illustrates that the pixel array 110e is grouped into two pixel groups, that is, PG1 and PG2, inventive concepts are not limited thereto, and the pixel array 110e may be grouped into three or more pixel groups, the pixels PX located at both sides in the uppermost row in each group may be implemented by the first pixel PX-1, and a plurality of other pixels PX may be implemented by the second pixel PX-2.

Figure 13:
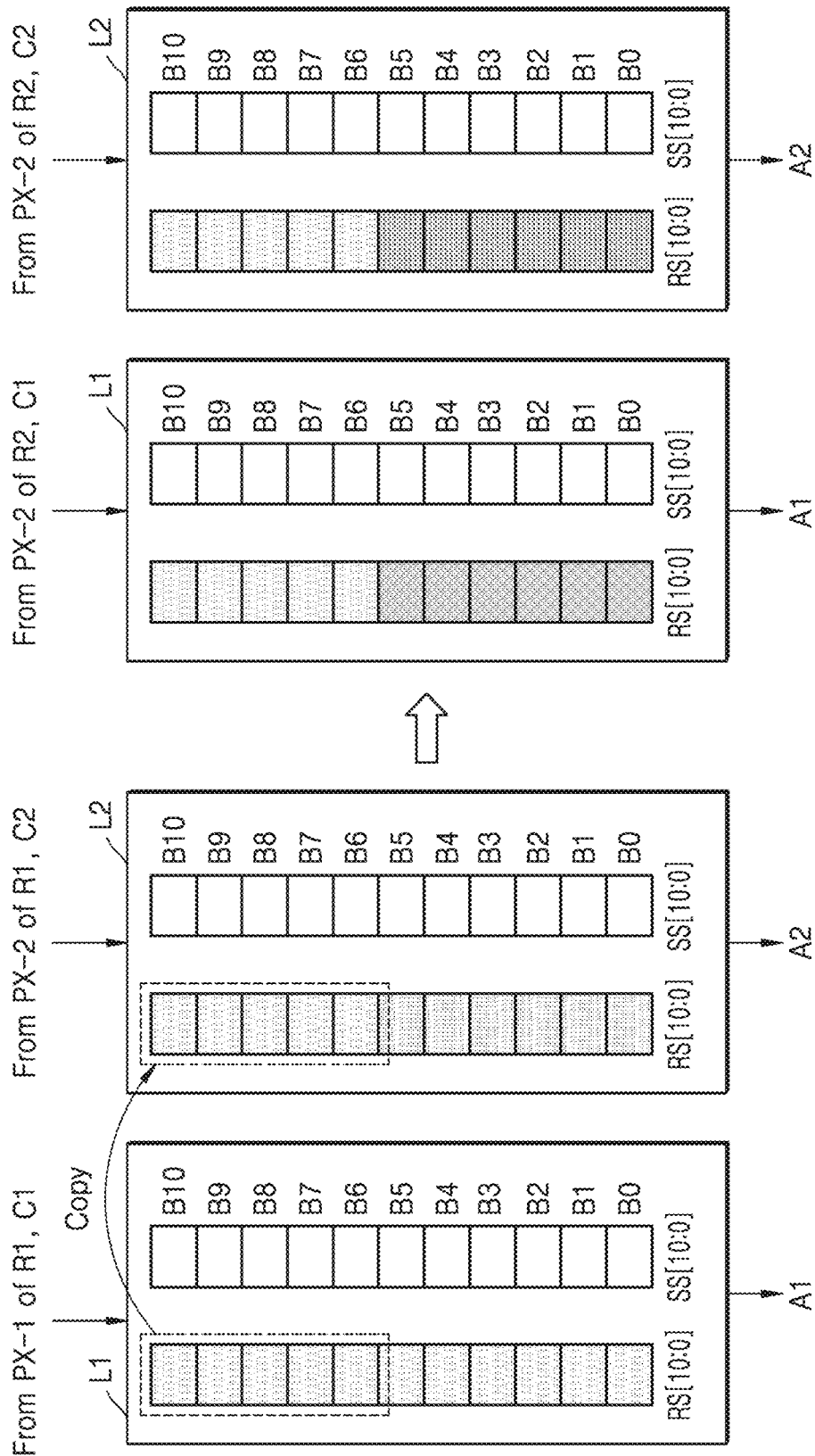
FIG. 13 is a diagram illustrating an example of an operation method of a latch, according to some example embodiments of inventive concepts.

FIG. 13 is a diagram illustrating an example of an operation method of a latch, according to some example embodiments of inventive concepts. FIG. 13 illustrates an operation method of latches processing reset values and sensing values, which are received from the pixel arrays 110c, 110d, and 110e of FIGS. 12A to 12C.

In FIG. 13, it is assumed that the first pixel PX-1 is arranged in the first column C1 of the first row R1 of the pixel array, that the second pixel PX-2 is arranged in the second column C2 of the first row R1, and that the second pixel PX-2 is arranged in each of the first and second columns C1 and C2 of the second row R2.

Each of the first latch L1 and the second latch L2, which respectively correspond to the first column C1 and the second column C2 of the pixel array, may include the reset sub-latch RS[10:0] and the sensing sub-latch SS[10:0], each including 11 bits, for example, the first to eleventh bits B0 to B10.

The 11-bit reset value and the 11-bit sensing value received from the first pixel PX-1 in the first row R1 and the first column C1 may be respectively stored in the reset sub-latch RS[10:0] of the first latch L1 and in the sensing sub-latch SS[10:0] of the first latch L1, and the 6-bit reset value and the 11-bit sensing value received from the second pixel PX-2 in the first row R1 and the second column C2 may be respectively stored in low-order 6 bits, for example, the first to sixth bits B0 to B5, of the reset sub-latch RS[10:0] of the second latch L2 and in the sensing sub-latch SS[10:0] of the second latch L2.

High-order 5 bits of the reset value of the first pixel PX-1, which are stored in high-order 5 bits, that is, the seventh to eleventh bits B6 to B10, of the reset sub-latch RS[10:0] of the first latch L1, may be copied to high-order 5 bits of the reset sub-latch RS[10:0] of the second latch L2.

Accordingly, 11 bits of data may be stored in the reset sub-latch RS[10:0] of the second latch L2. For example, the high-order 5 bits of the reset value of the first pixel PX-1 and the 6-bit reset value of the second pixel PX-2, which are stored in the second latch L2, may be set as a modified reset value of the second pixel PX-2 in the first row R1 and the first column C2.

Next, low-order 6 bits of the reset sub-latch RS[10:0] of the first latch L1 may be updated based on the 6-bit reset value received from the second pixel PX-2 in the second row R2 and the first column C1, and the sensing sub-latch SS[10:0] of the first latch L1 may be updated based on the 11-bit sensing value received therefrom. Low-order 6 bits of the reset sub-latch RS[10:0] of the second latch L2 may be updated based on the 6-bit reset value received from the second pixel PX-2 in the second row R2 and the second column C2, and the sensing sub-latch SS[10:0] of the second latch L2 may be updated based on the 11-bit sensing value received therefrom. The high-order 5 bits of each of the first latch L1 and the second latch L2 may maintain a previous value, for example, the high-order 5 bits of the reset value of the first pixel PX-1 in the first row R1 and the first column C1.

Accordingly, 11-bit data may be stored in the reset sub-latch RS[10:0] of each of the first latch L1 and the second latch L2. In other words, the high-order 5 bits of the reset value of the first pixel PX-1, which have already been stored in the first latch L1, and the 6-bit reset value of the second pixel PX-2 may be set as a modified reset value of the second pixel PX-2 in the second row R2 and the first column C1, and the high-order 5 bits of the reset value of the first pixel PX-1, which have already been stored in the second latch L2, and the 6-bit reset value of the second pixel PX-2 may be set as a modified reset value of the second pixel PX-2 in the second row R2 and the second column C2.

Figure 14:
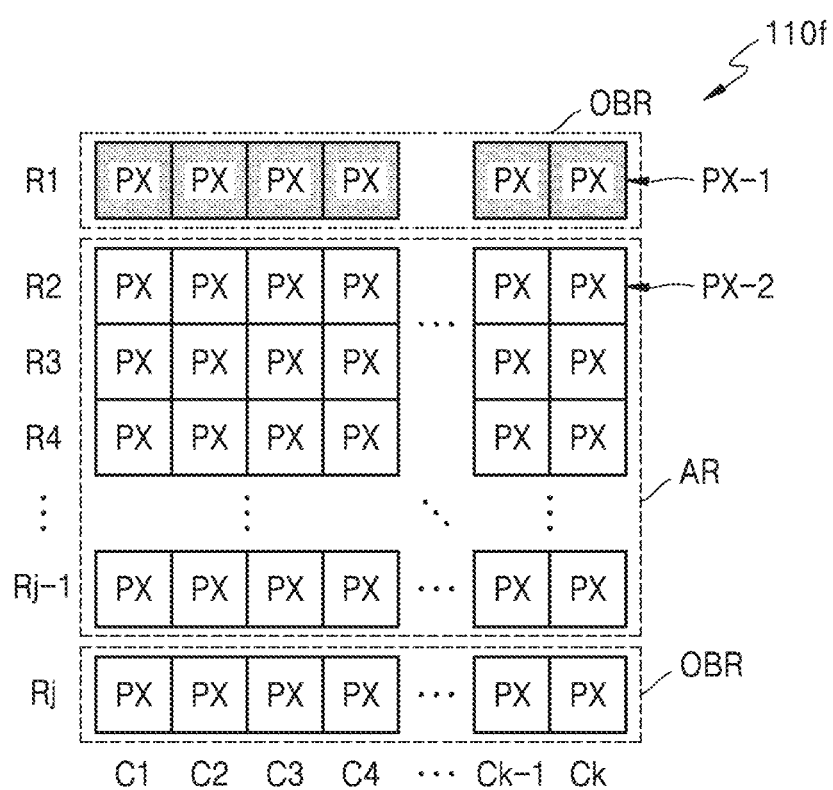
FIG. 14 illustrates a pixel array according to some example embodiments of inventive concepts.

FIG. 14 illustrates a pixel array according to some example embodiments of inventive concepts.

Referring to FIG. 14, a pixel array 110f may include an optical black region OBR and an active region AR, and pixel values generated from the pixels PX of the active region AR may constitute pixel data. The pixel values generated from the pixels PX of the optical black region OBR may be used to determine a black level that is a reference.

A plurality of pixels PX (or at least one pixel) of the first row R1 of the optical black region OBR may be implemented by the first pixel PX-1, and a plurality of pixels PX of the active region AR may be implemented by the second pixel PX-2.

Figure 15A:
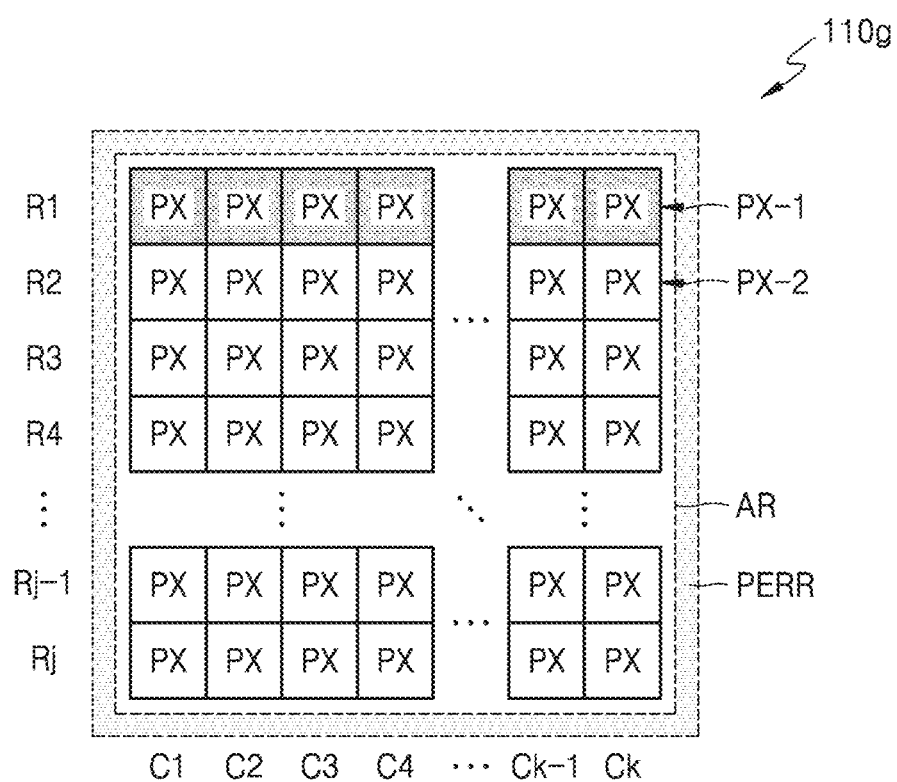
FIG. 15A illustrates a pixel array according to some example embodiments of inventive concepts.
Figure 15B:
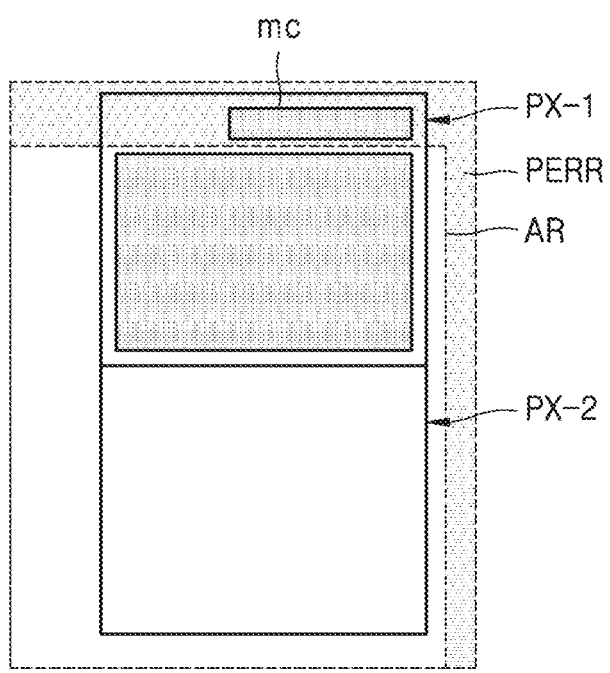
FIG. 15B illustrates a layout of a first pixel in the pixel array of FIG. 15A.

FIG. 15A illustrates a pixel array according to some example embodiments of inventive concepts, and FIG. 15B illustrates a layout of a first pixel in the pixel array of FIG. 15A.

Referring to FIG. 15A, a pixel array 110g may include the active region AR (alternatively referred to as a pixel region) and a peripheral region PERR.

A plurality of pixels PX (or at least one pixel) of the first row R1 of the active region AR may be implemented by the first pixel PX-1, and the other pixels PX may be implemented by the second pixel PX-2.

The layout of the first pixel PX-1 is similar to the layout of the second pixel PX-2. However, the number of memory cells of the reset memory of the first pixel PX-1 is greater than the number of memory cells of the reset memory of the second pixel PX-2. Here, as shown in FIG. 15B, memory cells mc additionally provided to the first pixel PX-1 may be formed in the peripheral region PERR.

FIGS. 16A and 16B each illustrate an implementation example of a pixel, according to some example embodiments of inventive concepts.

Referring to FIG. 16A, a pixel PXa may include a plurality of photodiodes 11a, 11b, 11c, and 11d, a pixel circuit 12a, the ADC 13, and the memory 14, and the pixel PXa may further include the switch SW. The pixel circuit 12a may include a plurality of transfer transistors TXa, TXb, TXc, and TXd, the reset transistor RX, the drive transistor DX, and the select transistor SX.

As compared with the pixel PX of FIG. 2, the pixel PXa includes the plurality of photodiodes 11a, 11b, 11c, and 11d, and the plurality of transfer transistors TXa, TXb, TXc, and TXd respectively corresponding to the plurality of photodiodes 11a, 11b, 11c, and 11d. The sizes and/or designs of the plurality of photodiodes 11a, 11b, 11c, and 11d may be equal to or different from each other.

Each of the plurality of transfer transistors TXa, TXb, TXc, and TXd may be turned on in response to a corresponding transfer control signal among a plurality of transfer control signals TSa, TSb, TSc, and TSd and may transfer, to the floating diffusion node FD, photocharges from a corresponding photodiode among the plurality of photodiodes 11a, 11b, 11c, and 11d.

The number of transfer transistors turned on among the plurality of transfer transistors TXa, TXb, TXc, and TXd may be adjusted, and the amount of photocharges transferred to the floating diffusion node FD may increase with the increasing number of transfer transistors that are turned on. For example, when surroundings are dark, e.g., when the amount of light received by the pixel PX is low, the number of transfer transistors turned on among the plurality of transfer transistors TXa, TXb, TXc, and TXd may be increased, and when surroundings are bright, the number of transfer transistors turned on among the plurality of transfer transistors TXa, TXb, TXc, and TXd may be decreased. Alternatively or additionally, in a situation in which counterlight is illuminated, low-luminance image data may be generated by turning-on a small number of transfer transistors in one frame period, high-luminance data may be generated by turning-on a large number of transfer transistors in the next frame period, and image data having an increased dynamic range may be generated based on the low-luminance image data and the high-luminance data. Here, one exposure may be performed in one frame period, and the photodiode may receive an optical signal during exposure time.

As another example, the plurality of photodiodes 11a, 11b, 11c, and 11d may respectively convert light having different colors into electrical signals, and the plurality of transfer transistors TXa, TXb, TXc, and TXd may be sequentially turned on in a plurality of frame periods, for example, four frame periods, whereby pieces of image data respectively corresponding to the different colors may be generated in the plurality of frame periods.

Although FIG. 16A illustrates that the pixel PXa includes four photodiodes, that is, the photodiodes 11a, 11b, 11c, and 11d, and four transfer transistors, that is, the transistors TXa, TXb, TXc, and TXd, inventive concepts is not limited thereto, and the number of photodiodes and the number of transfer transistors may vary.

Referring to FIG. 16B, a pixel PXb may include the plurality of photodiodes 11a, 11b, 11c, and 11d, a pixel circuit 12b, the ADC 13, and a plurality of memories 14a, 14b, 14c, and 14d, and the pixel PXb may further include a plurality of switches SWa, SWb, SWc, and SWd respectively connected to the plurality of memories 14a, 14b, 14c, and 14d. The pixel circuit 12a may include the plurality of transfer transistors TXa, TXb, TXc, and TXd, the reset transistor RX, the drive transistor DX, and the select transistor SX.

As compared with the pixel PXa, the pixel PXb may include the plurality of memories 14a, 14b, 14c, and 14d and the plurality of switches SWa, SWb, SWc, and SWd. In an embodiment, as shown in FIG. 16A, the number of memories regarding the plurality of memories 14a, 14b, 14c, and 14d may be equal to the number of photodiodes regarding the plurality of photodiodes 11a, 11b, 11c, and 11d, and the plurality of memories 14a, 14b, 14c, and 14d may respectively correspond to the plurality of photodiodes 11a, 11b, 11c, and 11d.

For example, the plurality of photodiodes 11a, 11b, 11c, and 11d may respectively convert light having different colors into electrical signals, and the plurality of transfer transistors TXa, TXb, TXc, and TXd may be sequentially turned on in the ADC period ($P_{ADC}$ of FIG. 5A) of one frame period, whereby reset signals and sensing signals, which correspond to the plurality of photodiodes 11a, 11b, 11c, and 11d, may be sampled and may be stored as respective reset values and respective sensing signals in the respective plurality of memories 14a, 14b, 14c, and 14d. Next, in the transfer period PTRF, the plurality of switches SWa, SWb, SWc, and SWd may be sequentially turned on in response to each corresponding row enable signal among a plurality of row enable signals EN_R. Accordingly, a plurality of sensing values and/or a plurality of reset values stored in the plurality of memories 14a, 14b, 14c, and 14d and corresponding to the plurality of photodiodes 11a, 11b, 11c, and 11d may be sequentially transferred to the read circuit (150 of FIG. 1). The read circuit 150 may generate a plurality of pieces of image data respectively corresponding to different colors in one frame period, based on the received plurality of reset values and the received plurality of sensing values.

In an example embodiment, the number of memories regarding the plurality of memories 14a, 14b, 14c, and 14d may be different from the number of photodiodes regarding the plurality of photodiodes 11a, 11b, 11c, and 11d. For example, the pixel PXb may include two memories, and in the ADC period $P_{ADC}$, a reset value, and a sensing value that corresponds to a photodiode present in a relatively low number among the plurality of photodiodes 11a, 11b, 11c, and 11d may be stored in one memory, and a reset value, and a sensing value that corresponds to a photodiode present in a relatively high number among the plurality of photodiodes 11a, 11b, 11c, and 11d may be stored in the other memory. Next, in the transfer period $P_{TRF}$, the sensing values (and the reset values) may be sequentially output from the two memories and be transferred to the read circuit 150. The read circuit 150 may generate low-luminance image data and high-luminance image data in one frame period, based on the received sensing values and the received reset values.

Each of the plurality of memories 14a, 14b, 14c, and 14d may include the reset memory RM and the sensing memory SM. When the pixel array (110 of FIG. 1) is implemented by the pixel PXb of FIG. 16B, as described above, in at least one of the plurality of pixels PXb, the number of bits of at least one reset memory RM among a plurality of reset memories RM respectively included in the plurality of memories 14a, 14b, 14c, and 14d may be greater than each number of bits of the other reset memories of the same pixel PXb and reset memories included in the other pixels PXb.

Figure 17A:
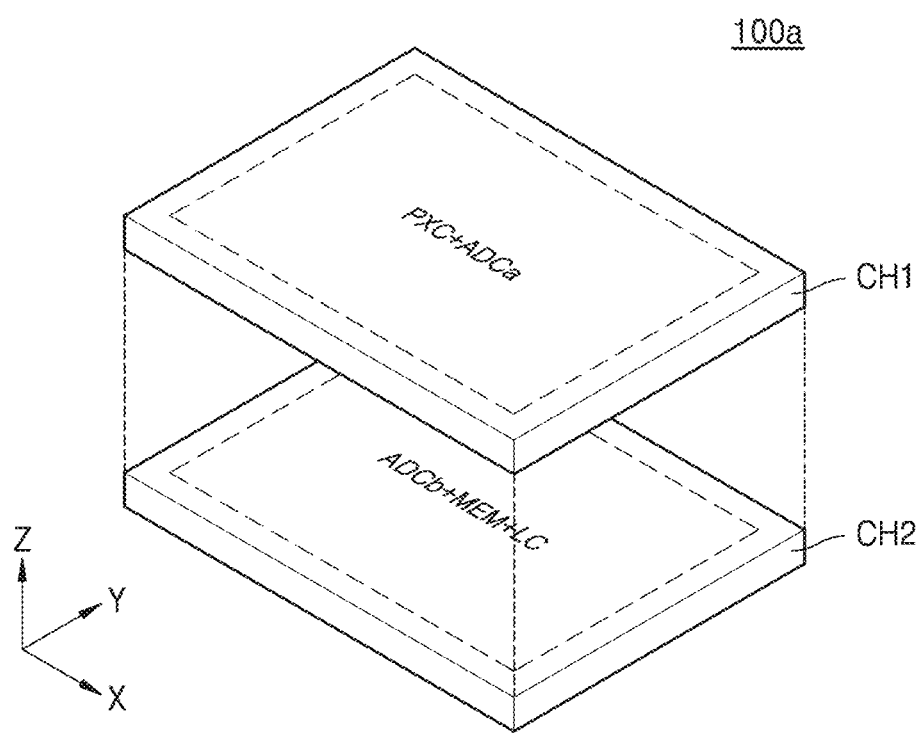
FIGS. 17A and 17B each illustrate a stack structure of an image sensor, according to some example embodiments of inventive concepts.
Figure 17B:
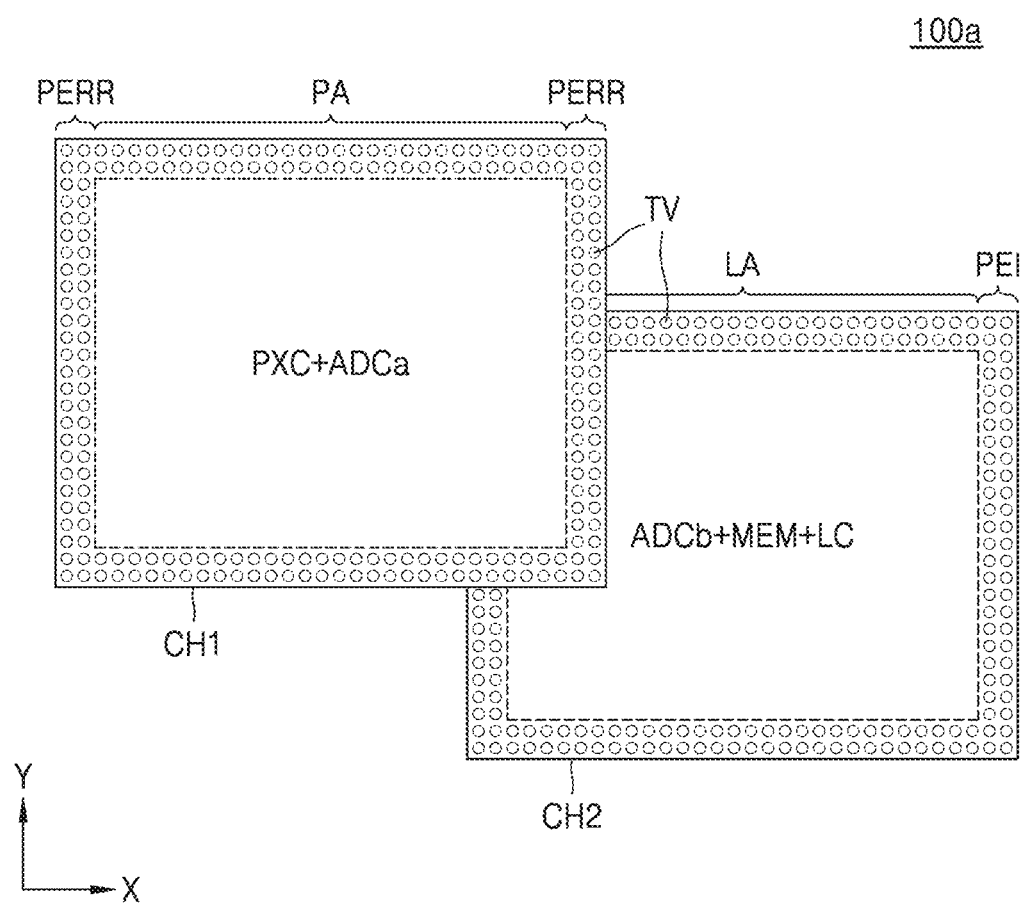

FIGS. 17A and 17B each illustrate a stack structure of an image sensor, according to some example embodiments of inventive concepts. FIG. 17A is an exploded perspective view of the image sensor, and FIG. 17B is a plan view of the image sensor.

Referring to FIGS. 17A and 17B, an image sensor 100a may have a structure in which a first chip CH1 and a second chip CH2 are stacked. In the first chip CH1, a pixel core PXC (for example, at least one photodiode and a pixel circuit) of each of the plurality of pixels PX included in the pixel array (110 of FIG. 1) and a portion ADCa of the ADC (13 of FIG. 2) thereof may be formed, and in the second chip CH2, the remaining portion ADCb of the ADC of each of the plurality of pixels PX, a memory MEM (for example, 14 of FIG. 2), and a logic circuit LC (for example, the row driver 120, the read circuit 130, the counter block 140, the ramp signal generator 150, and the timing controller 160 in FIG. 1) may be formed. For example, the ADC may be implemented by a p-channel metal oxide semiconductor field effect transistor (MOSFET) (PMOS) and an n-channel MOSFET (NMOS), one of the PMOS and the NMOS may be arranged in the first chip CH1, and the other may be arranged in the second chip CH2. The first chip CH1 may be stacked over the second chip CH2. The first chip CH1 and the second chip CH2 may be stacked with a through-silicon via (TSV) therebetween; however, example embodiments are not limited thereto.

As shown in FIG. 17B, the first chip CH1 and the second chip CH2 may respectively include a pixel area PA and a logic area LA, which are arranged in central areas and correspond to active regions, and may respectively include peripheral regions PERR and PEI arranged in outer regions of the chips. In the pixel area PA of the first chip CH1, the pixel cores PXC and portions of the ADCs may be arranged in a 2-dimensional array structure. In the logic area LA of the second chip CH2, the remaining portions of the ADCs and the memory MEM may be arranged in a 2-dimensional array structure, and the logic circuit LC may also be arranged.

In the peripheral regions PERR and PEI of the first chip CH1 and the second chip CH2, through-vias TV extending in a third direction (z direction) may be arranged. The first chip CH1 may be electrically coupled to the second chip CH2 through the through-vias TV. In the peripheral region PERR of the first chip CH1, wiring lines extending in a first direction (x direction) or a second direction (y direction) and vertical contacts may be further formed. The remaining portions of the ADCs, the memory MEM, and the logic circuits LC may be arranged in a lower portion of the second chip CH2 in the third direction (Z direction), and a wiring layer may be arranged in an upper portion thereof. A large number of wiring lines extending in the first direction (x direction) and the second direction (y direction) may also be arranged in the wiring layer of the second chip CH2, and these wiring lines may be connected to the remaining portions of the ADCs, the memory MEM, and the logic circuits LC.

Although the structure, in which the first chip CH1 is electrically coupled to the second chip CH2 through the through-vias TV, has been described, inventive concepts are not limited thereto and, for example, the electrical coupling of the first chip CH1 and the second chip CH2 may be implemented by various coupling structures such as Cu—Cu bonding, coupling of a through-via and a Cu pad, coupling of a through-via and an external connection terminal, coupling through an integral through-via, and/or the like.

Figure 18:
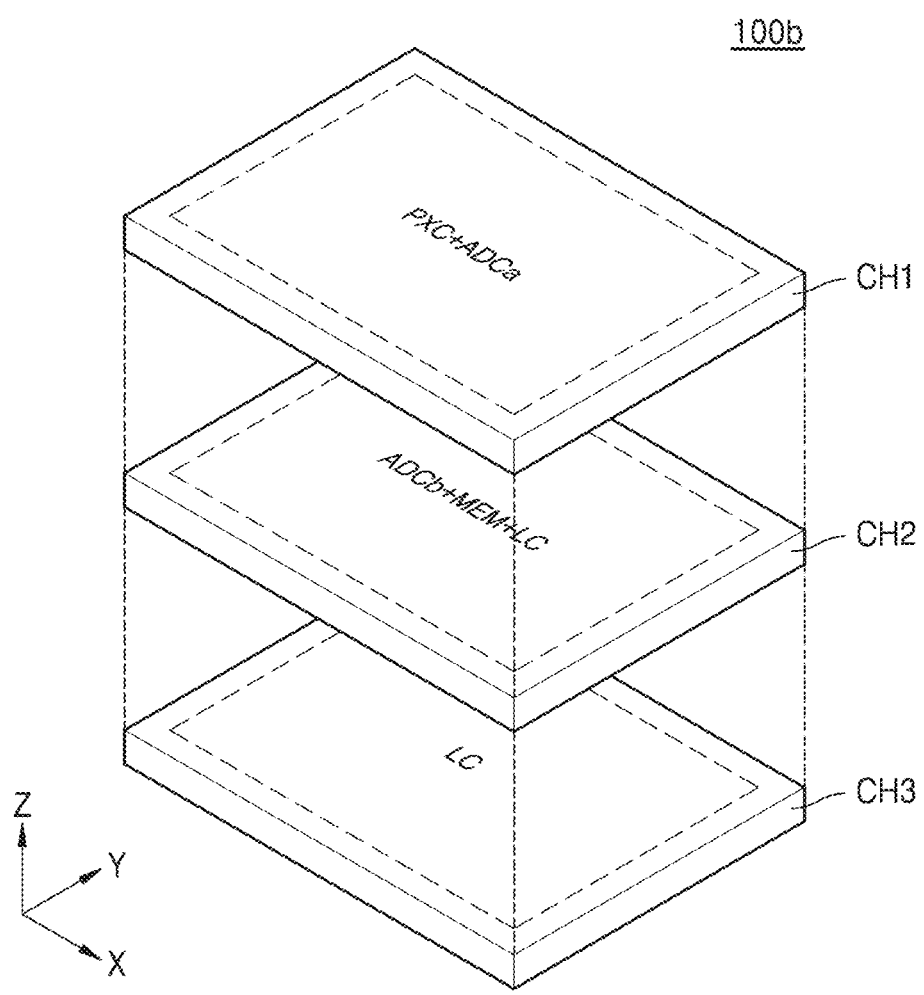
FIG. 18 illustrates a stack structure of an image sensor, according to some example embodiments of inventive concepts.

FIG. 18 illustrates a stack structure of an image sensor, according to some example embodiments of inventive concepts.

Referring to FIG. 18, an image sensor 100b may have a structure in which a first chip CH1, a second chip CH2, and a third chip CH3 are stacked. In the first chip CH1, the pixel core PXC (for example, at least one photodiode and a pixel circuit) of each of the plurality of pixels PX included in the pixel array (110 of FIG. 1) may be formed in a 2-dimensional array structure, and in the second chip CH2, an ADC and the memory MEM, which are included in each of the plurality of pixels PX, may be formed in a 2-dimensional array structure. In addition, the logic circuit LC may be formed in the third chip CH3.

As described with reference to FIGS. 17A and 17B, the first chip CH1, the second chip CH2, and the third chip CH3 may be electrically coupled to each other through through-vias formed in peripheral regions arranged in outer areas thereof and, as another example, the first chip CH1, the second chip CH2, and the third chip CH3 may be electrically coupled to each other by Cu—Cu bonding, coupling of a through-via and a Cu pad, coupling of a through-via and an external connection terminal, or coupling through an integral through-via.

Although the image sensors 100a and 100b having a 2-layer or 3-layer structure have been described with reference to FIGS. 17A and 17B and FIG. 18, the structure of the image sensor is not limited thereto. For example, the image sensor may have a 4-layer structure including first to fourth chips, and a pixel core, an ADC, a memory, and a logic circuit may be respectively formed in the first chip, which is located at the uppermost position, up to the fourth chip.

Figure 19:
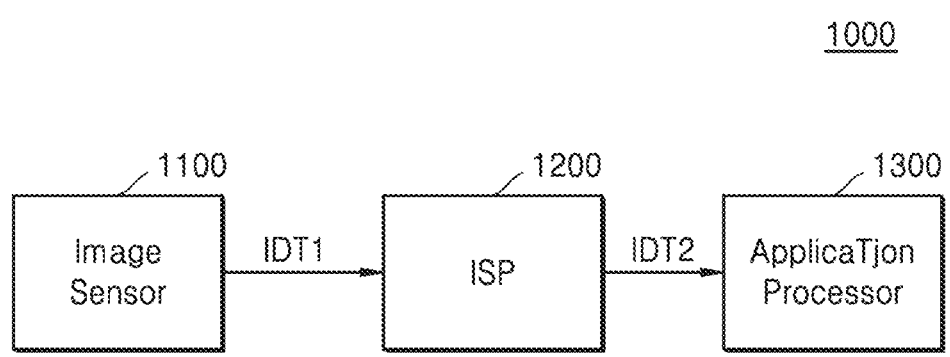
FIG. 19 is a block diagram illustrating an image processing device according to some example embodiments of inventive concepts.

FIG. 19 is a block diagram illustrating an image processing device according to some example embodiments of inventive concepts.

Referring to FIG. 19, an image processing device (or image pickup device) 1000 may include an image sensor 1100, an image signal processor 1200, and an application processor 1300. In an embodiment, the image signal processor 1200 may be included in the image sensor 1100 or the application processor 1300. The image sensor 1100 may include one of the pixel arrays 110, 110a, 110b, 110c, 110d, 110e, 110f, and 110g according to the embodiments described above, and a read circuit.

The image signal processor 1200 may perform image processing on first image data IDT1 received from the image sensor 1100. For example, the image signal processor 1200 may perform image processing, such as size change or image quality conversion, on the first image data IDT1. Second image data IDT2 resulted from the image processing may be provided to the application processor 1300.

The application processor 1300 may perform an additional operation based on the received second image data IDT2. In an example embodiment, the application processor 1300 may include an image processing engine performing higher-level image processing than the image signal processor 1200, and the image processing engine may perform image processing on the second image data IDT2. For example, the image processing engine may perform image processing, such as changing a data format of the second image data IDT2, or generating an interpolation frame based on a plurality of frames of the second image data IDT2.

Figure 20:
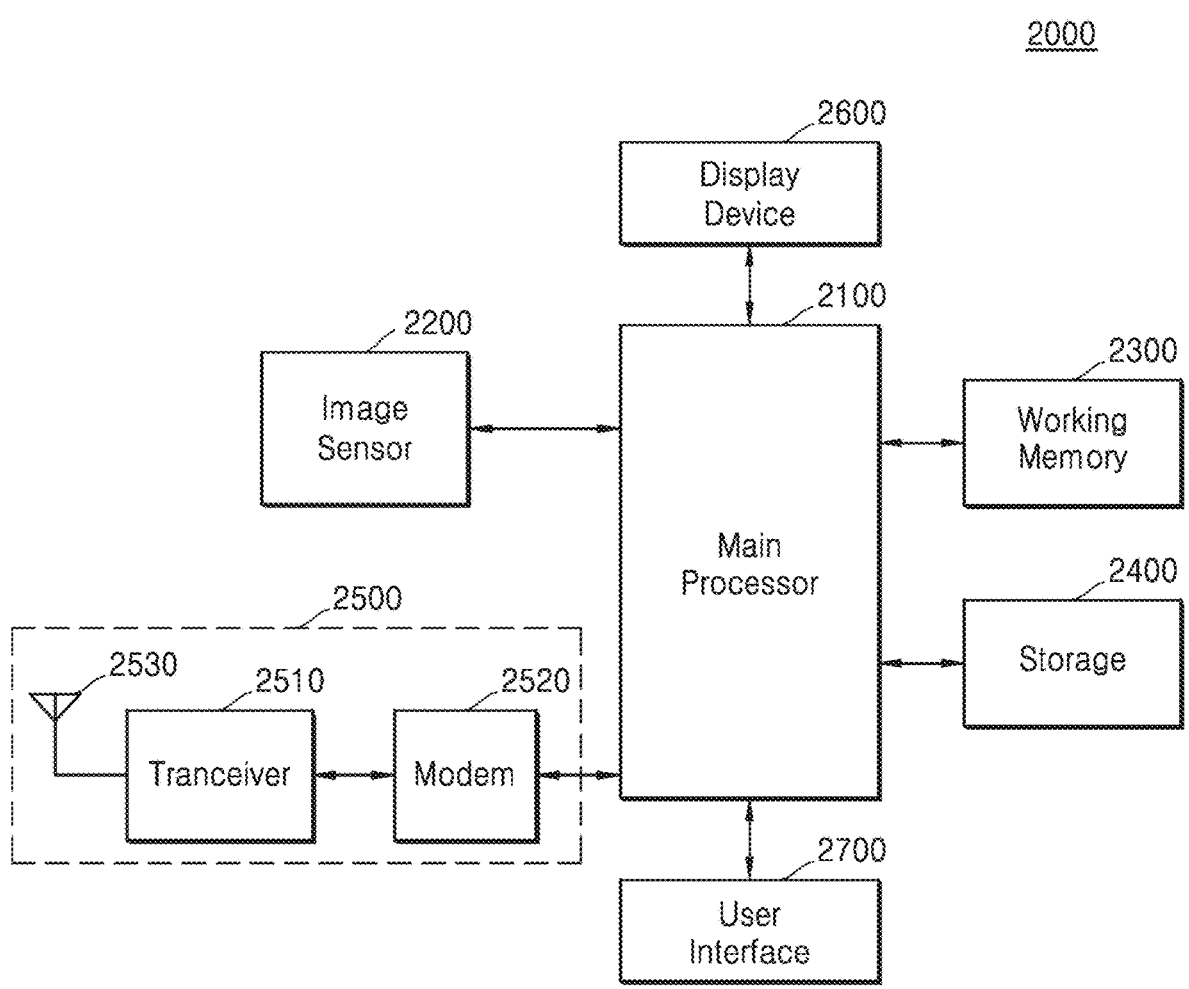
FIG. 20 is a block diagram illustrating an electronic device including an image sensor, according to some example embodiments of inventive concepts.

FIG. 20 is a block diagram illustrating an electronic device including an image sensor, according to some example embodiments of inventive concepts. An electronic device 2000 of FIG. 20 may be a portable terminal.

Referring to FIG. 20, the electronic device 2000 may include a main processor 2100, an image sensor 2200, a display device 2600, a working memory 2300, storage 2400, a user interface 2500, and a wireless transmitter/receiver 2500.

The main processor 2100 may control overall operations of the electronic device 2000 and may be implemented by a system-on-chip (SoC) for driving applications, operating systems, and the like. The main processor 2100 may provide image data, which is provided from the image sensor 2200, to the display device 2600 or may store the image data in the storage 2400. In an example embodiment, the main processor 2100 may include an image processing circuit and may perform image processing, such as an image adjustment, a data format change, and the like, on the image data received from the image sensor 2200.

The image sensor 100 described with reference to FIG. 1 may be applied as the image sensor 2200. A pixel array of the image sensor 2200 may be implemented by some first pixels and a large majority of second pixels, and each of the first and second pixels may include a reset memory and a sensing memory, which respectively store a reset value and a sensing value. The reset value and the sensing value may be transferred to a read circuit on the basis of each row of the pixel array, and a pixel value may be generated based on the reset value and the sensing value, which are transferred.

At least one high-order bit of the reset value of the first pixel may be used as at least one high-order bit of the reset value of the second pixel. Accordingly, the number of bits of the reset memory of the second pixel may be less than the number of bits of the reset memory of the first pixel. Therefore, the areas of the pixel array and the image sensor 2200 may be reduced, and a frame rate of the image sensor 2200 may be increased.

The working memory 2300 may be implemented by volatile memory such as DRAM, SRAM, or the like or by non-volatile resistive memory such as FeRAM, RRAM, PRAM, and/or the like. The working memory 2300 may store programs and/or data processed or executed by the main processor 2100.

The storage 2400 may be implemented by non-volatile memory such as NAND flash memory, resistive memory, or the like and, for example, the storage 2400 may be provided as a memory card (MMC, eMMC, SD, or micro SD) or the like. The storage 2400 may store the image data provided from the image sensor 2200.

The user interface 2700 may be implemented by various devices capable of receiving user inputs, such as a keyboard, a curtain key panel, a touch panel, a fingerprint sensor, a microphone, and the like. The user interface 2700 may receive a user input and may provide a signal corresponding to the received user input to the main processor 2100.

The wireless transmitter/receiver 2500 may include a transceiver 2510, a modem 2520, and an antenna 2530.

While inventive concepts has been particularly shown and described with reference to embodiments thereof, it will be understood that various changes in form and details may be made therein without departing from the spirit and scope of the following claims.

What is claimed is:

1. A pixel array comprising:
 a plurality of pixels, arranged in a matrix form, each of the plurality of pixels configured to convert an optical signal into an electrical signal, the pixel array including,
 a first pixel in a first row of the pixel array, and
 a second pixel in a second row of the pixel array,
 wherein each of the first pixel and the second pixel includes a first memory configured to store a reset value associated with internal noise,
 the first memory of the first pixel is configured to store m-bit data (where m is a natural number greater than or equal to 2), and
 the first memory of the second pixel is configured to store n-bit data (where n is a natural number less than m).

2. The pixel array of claim 1, wherein each of the first pixel and the second pixel further comprises:
 a photoelectric conversion device configured to convert a received optical signal into photocharges;
 a pixel circuit configured to output the photocharges as a sensing signal;
 an analog-digital converter configured to convert a reset signal and the sensing signal of the pixel circuit into the reset value and a sensing value, respectively, the reset value and the sensing value being digital signals; and
 a second memory configured to store the sensing value.

3. The pixel array of claim 2, wherein a number of bits of the second memory of the first pixel is equal to a number of bits of the second memory of the second pixel.

4. The pixel array of claim 3, wherein, in the first pixel, a number of bits of the first memory is equal to the number of bits of the second memory.

5. The pixel array of claim 2, wherein, in the first pixel, a number of bits of the first memory is less than a number of bits of the second memory.

6. The pixel array of claim 2, wherein, in the second pixel, a number of bits of the first memory is less than a number of bits of the second memory.

7. The pixel array of claim 1, wherein the pixel array is configured to transfer a first reset value stored in the first memory of the first pixel to a read circuit, and then, the pixel array is configured to transfer a second reset value stored in the first memory of the second pixel to the read circuit.

8. The pixel array of claim 7, wherein the pixel array is configured to use at least one high-order bit of the first reset value as at least one high-order bit of the second pixel.

9. The pixel array of claim 1, wherein the plurality of pixels are grouped into a plurality of pixel groups,
 an uppermost row of each of the plurality of pixel groups comprises the first pixel, and
 each of other rows of each of the plurality of pixel groups comprise the second pixel.

10. The pixel array of claim 1, wherein the first pixel is in at least one of columns at both sides in the first row.

11. The pixel array of claim 1, wherein the pixel array comprises an active region and an optical black region, and
 the first pixel is in the optical black region.

12. The pixel array of claim 1, wherein the pixel array comprises an active region and a peripheral region,
 the first pixel is in the active region, and
 at least some bits of the first memory of the first pixel are in the peripheral region.

13. An image sensor comprising:
 a pixel array comprising a plurality of pixels, each of the plurality of pixels comprising a memory configured to store a reset value and a sensing value, wherein a number of bits of the memory of a first pixel among the plurality of pixels is greater than a number of bits of the memory of a second pixel among the plurality of pixels; and
 a read circuit configured to receive, from the pixel array, a plurality of reset values and a plurality of sensing values sequentially on a row basis, and configured to generate image data based on the plurality of reset values and the plurality of sensing values.

14. The image sensor of claim 13, wherein the memory comprises a reset memory and a sensing memory, the reset memory configured to store the reset value, and the sensing memory configured to store the sensing value,
 a number of bits of the reset memory of the first pixel is different from a number of bits of the reset memory of the second pixel, and
 a number of bits of the sensing memory of the first pixel is equal to a number of bits of the sensing memory of the second pixel.

15. The image sensor of claim 13, wherein the first pixel is in a first row of the pixel array, and
 the second pixel is in a plurality of rows comprising a second row of the pixel array.

16. The image sensor of claim 13, wherein the read circuit comprises a plurality of latches respectively corresponding to a plurality of columns of the pixel array and a plurality of calculators respectively corresponding to the plurality of columns of the pixel array,
 each of the plurality of latches is configured to store a reset value and a sensing value, and
 each of the plurality of calculators is configured to calculate a pixel value based on the reset value and the sensing value, the reset value and the sensing value being provided from each of the plurality of latches.

17. The image sensor of claim 16, wherein, based on at least one high-order bit of a first reset value received from the first pixel and on a second reset value received from the second pixel, each of the plurality of latches is configured to generate a modified second reset value corresponding to the second pixel.

18. The image sensor of claim 16, wherein, based on a default value and on a first reset value received from the first pixel, each of the plurality of latches is configured to generate a modified first reset value corresponding to the first pixel.

19. An image sensor comprising:
- a ramp signal generator configured to generate a ramp signal;
- a counter block configured to generate a counting code;
- a pixel array comprising a plurality of pixels arranged in a matrix form, each of the plurality of pixels configured to generate a reset value and a sensing value based on the ramp signal and the counting code and configured to store the reset value and the sensing value; and
- a read circuit configured to receive a plurality of reset values and a plurality of sensing values from the pixel array and configured to generate a plurality of pixel values based on the plurality of reset values and the plurality of sensing values, wherein the pixel array includes,
- a first pixel in a first row, and
- a second pixel in a second row,
- each of the first pixel and the second pixel comprises a first memory configured to store a reset value according to internal noise,
- the first memory of the first pixel is configured to store m-bit data (where m is a natural number equal to or greater than 2), and
- the first memory of the second pixel is configured to store n-bit data (where n is a natural number less than m).

20. The image sensor of claim 19, wherein each of the first pixel and the second pixel further comprises a second memory configured to store a sensing value, and
- a number of bits of the second memory of the first pixel is equal to a number of bits of the second memory of the second pixel.

\* \* \* \* \*